United States Patent
Sanders

(10) Patent No.: US 8,963,692 B2
(45) Date of Patent: Feb. 24, 2015

(54) AGGREGATING AND ROUTING SENSOR DATA AT A COMMUNITY SENSOR-COORDINATING ENTITY

(75) Inventor: Jeffery A. Sanders, Cocoa, FL (US)

(73) Assignee: Cisco Technology, Inc., San Jose, CA (US)

( * ) Notice: Subject to any disclaimer, the term of this patent is extended or adjusted under 35 U.S.C. 154(b) by 548 days.

(21) Appl. No.: 12/916,275

(22) Filed: Oct. 29, 2010

(65) Prior Publication Data

US 2012/0105214 A1    May 3, 2012

(51) Int. Cl.
*H04Q 5/22* (2006.01)
*H04L 29/08* (2006.01)
*H04W 4/00* (2009.01)

(52) U.S. Cl.
CPC .............. *H04L 67/12* (2013.01); *H04L 67/327* (2013.01); *H04W 4/006* (2013.01)
USPC ...... 340/10.42; 340/5.81; 340/5.83; 719/328; 709/204; 709/223; 705/400; 455/466

(58) Field of Classification Search
CPC ............. G06K 7/0008; G06K 19/0723; G07C 9/00111; G08G 1/017; A01K 11/006; H04L 67/125; H04L 67/306; H04L 67/327; H04L 67/12; H04W 4/006
USPC ......... 340/10.42, 10.1, 10.4, 10.41, 5.2, 5.61, 340/5.81, 5.83, 572.1, 573.1, 568.1; 705/400; 709/204, 223; 455/466; 719/328
See application file for complete search history.

(56) References Cited

U.S. PATENT DOCUMENTS

| | | | |
|---|---|---|---|
| 4,809,257 A | 2/1989 | Gantenbein et al. | |
| 5,202,929 A | 4/1993 | Lemelson | |
| 6,735,630 B1 | 5/2004 | Gelvin et al. | |
| 7,053,767 B2 | 5/2006 | Petite et al. | |
| 7,213,056 B2 | 5/2007 | McClung | |
| 7,310,413 B2 | 12/2007 | McClung | |
| 7,340,046 B2 | 3/2008 | McClung | |
| 8,754,780 B2 | 6/2014 | Petite et al. | |
| 2002/0079368 A1* | 6/2002 | Hankins ........................ | 235/383 |
| 2002/0098849 A1 | 7/2002 | Bloebaum et al. | |
| 2002/0111822 A1 | 8/2002 | Shimizu et al. | |
| 2002/0125998 A1 | 9/2002 | Petite et al. | |
| 2003/0229528 A1* | 12/2003 | Nitao et al. ....................... | 705/7 |
| 2004/0002662 A1 | 1/2004 | Hjelt et al. | |
| 2004/0028027 A1 | 2/2004 | McClung | |
| 2004/0133314 A1* | 7/2004 | Ehlers et al. .................. | 700/276 |
| 2004/0180686 A1 | 9/2004 | Nakayama | |
| 2004/0243355 A1 | 12/2004 | Kobayashi | |

(Continued)

OTHER PUBLICATIONS

"About XMethods," http://www.xmethods.net/ve2/About.po, Downloaded Dec. 8, 2010.

(Continued)

*Primary Examiner* — Steven Lim
*Assistant Examiner* — Sisay Yacob
(74) *Attorney, Agent, or Firm* — Baker Botts L.L.P.

(57) ABSTRACT

In one embodiment, a method includes receiving sensor data from multiple sensors associated with multiple persons; for each of the sensors, identifying the person associated with the sensor; determining whether the sensor data are valid; and, for the sensor data that are valid, aggregating them based on the associations of their sensors with the persons and routing them to one or more sensor-application-service providers based on associations of the persons with the sensor-application-service providers.

42 Claims, 11 Drawing Sheets

(56) References Cited

U.S. PATENT DOCUMENTS

| | | | |
|---|---|---|---|
| 2005/0154598 A1 | 7/2005 | Kanayama et al. | |
| 2005/0267766 A1 | 12/2005 | Galbreath et al. | |
| 2006/0093115 A1 | 5/2006 | Chen | |
| 2006/0205564 A1* | 9/2006 | Peterson | 482/8 |
| 2008/0065427 A1 | 3/2008 | Helitzer et al. | |
| 2008/0075118 A1 | 3/2008 | Knight et al. | |
| 2008/0134158 A1 | 6/2008 | Salz et al. | |
| 2008/0157971 A1* | 7/2008 | Schuler et al. | 340/572.1 |
| 2008/0162555 A1* | 7/2008 | Schuler et al. | 707/104.1 |
| 2008/0229308 A1 | 9/2008 | Wyman | |
| 2009/0138244 A1* | 5/2009 | Schuler et al. | 703/2 |
| 2009/0149206 A1 | 6/2009 | De Amorim et al. | |
| 2010/0232653 A1 | 9/2010 | Muquit et al. | |
| 2010/0254254 A1 | 10/2010 | Chan et al. | |
| 2011/0145894 A1 | 6/2011 | Morchon et al. | |
| 2013/0132979 A1 | 5/2013 | Ross | |

OTHER PUBLICATIONS

"Drupal—Open Source CMS," http://drupal.org/, Downloaded Dec. 8, 2010.
"Facebook—Wall," http://www.facebook.com/facebook?v=wall Downloaded on Dec. 8, 2010.
"Facebook—Get Involved," http://www.facebook.com/facebook?v=app_10531514314 Downloaded on Dec. 8, 2010.
"Groups—LinkedIn Learning Center," http://learn.linkedin.com/groups/ Downloaded on Dec. 8, 2010.
Help Center—Facebook; Groups http://www.facebook.com/help/?pages=414 Downloaded on Dec. 8, 2010.
"Help Center—Facebook; Groups: Admin Basics," http://www.facebook.com/help/?page=18829 Downloaded on Dec. 8, 2010.
"Help Center—Facebook; Groups: Group Privacy and Abuse," http://www.facebook.com/help/?page=982 Downloaded Dec. 8, 2010.
"Help Center—Facebook; Groups: Group features," http://www.facebook.com/help/?page=18832 Downloaded Dec. 8, 2010.
Help Center—Facebook; Groups: Bugs and Known Issues, http://www.facebook.com/help/?page=783 Downloaded on Dec. 8, 2010.
Help Center—Facebook, http://www.facebook.com/help Downloaded on Dec. 8, 2010.
Help Center—Facebook; Group Basics, http://www.facebook.com/help/?page=18831 Downloaded on Dec. 8, 2010.
"Home—Adobe Flex.org," http://flex.org/ on Dec. 8, 2010.
"Joomla!" http://www.joomla.org/ Downloaded Dec. 8, 2010.
"LinkedIn Learning Center—Resources," http://learn.linkedin.com/ Downloaded Dec. 8, 2010.
"LinkedIn—About US," http://press.linkedin.com/about, Downloaded Dec. 8, 2010.
"Ning—Create Your Own Social Network," http://www.ning.com/ Downloaded Dec. 8, 2010.
"Relationships Matter—LinkedIn," http://www.linkedin.com/ Downloaded Dec. 8, 2010.
"The gSOAP Toolkit for SOAP Web Services and XML-Based Applications," http://www.cs.fsu.edu/~engelen/soap.html, Downloaded Dec. 8, 2010.
"Web Services—Axis," http://ws.apache.org/axis, Downloaded Dec. 8, 2010.
"Welcome to XMethods," http://www.xmethods.net/ve2/index.po, Downloaded Dec. 8, 2010.
"What is LinkedIn?," http://www.linkedin.com/static?key=what_is_linkedin&trk=hb_what Downloaded Dec. 8, 2010.
U.S. Appl. No. 12/916,211, filed Oct. 29, 2010.
U.S. Appl. No. 12/916,235, filed Oct. 29, 2010.
U.S. Appl. No. 12/916,264, filed Oct. 29, 2010.
U.S. Appl. No. 12/916,285, filed Oct. 29, 2010.
Jeffery A. Sanders, U.S. Appl. No. 12/916,211, non-final Office Action, Nov. 8, 2013.
Jeffery A. Sanders, U.S. Appl. No. 12/916,211, Response Pursuant to 37 C.F.R. § 1.111, Feb. 10, 2014.
Jeffery A. Sanders; U.S. Response Pursuant to 37 C.F.R. § 1.111; U.S. Appl. No. 12/916,285, filed Oct. 29, 2010, Dec. 10, 2013.
Jeffery A. Sanders; U.S. final Office Action; U.S. Appl. No. 12/916,235, filed Oct. 29, 2010, Jan. 29, 2014.
Jeffery A. Sanders; U.S. final Office Action; U.S. Appl. No. 12/916,264, filed Oct. 29, 2010, Jan. 31, 2014.
USPTO, Jeffery A. Sanders, Final Office Action, U.S. Appl. No. 12/916,285, filed Oct. 29, 2010, Notification Date: Apr. 11, 2014.
Jeffery A. Sanders; U.S. non-final Office Action; U.S. Appl. No. 12/916,285, filed Oct. 29, 2010, Sep. 10, 2013.
Jeffery A. Sanders; U.S. non-final Office Action; U.S. Appl. No. 12/916,285, filed Oct. 29, 2010, Apr. 2, 2013.
Jeffery A. Sanders; U.S. non-final Office Action; U.S. Appl. No. 12/916,264, filed Oct. 29, 2010, Apr. 12, 2013.
Jeffery A. Sanders; U.S. non-final Office Action; U.S. Appl. No. 12/916,264, filed Oct. 29, 2010, Jul. 31, 2013.
Jeffery A. Sanders; U.S. non-final Office Action; U.S. Appl. No. 12/916,235, filed Oct. 29, 2010, Jul. 2, 2013.
Jeffery A. Sanders; Response Pursuant to 37 C.F.R. § 1.111; U.S. Appl. No. 12/916,235, Oct. 2, 2013.
Jeffery A. Sanders; ; Response Pursuant to 37 C.F.R. § 1.111; U.S. Appl. No. 12/916,264, May 14, 2013.
Jeffery A. Sanders; Response Pursuant to 37 C.F.R. § 1.111; U.S. Appl. No. 12/916,285, May 14, 2013.
US Final Office Action; U.S. Appl. No. 12/916,211, Jeffery Sanders, Jun. 6, 2014.
Request for Continued Examination and Amendment; U.S. Appl. No. 12/916,235, Jeffery Sanders, Apr. 29, 2014.
Request for Continued Examination and Amendment; U.S. Appl. No. 12/916,264, Jeffery Sanders, May 29, 2014.
US Non-Final Office Action; U.S. Appl. No. 12/916,235; Jeffery Sanders; Jul. 11, 2014.
Request for Continued Examination and Amendment; U.S. Appl. No. 12/916,211; Jeffery Sanders; Jun. 20, 2014.
Request for Continued Examination and Amendment; U.S. Appl. No. 12/916,285; Jeffery Sanders; Jul. 11, 2014.
US Non-Final Office Action; U.S. Appl. No. 12/916,264; Jeffery Sanders; Jul. 8, 2014.

* cited by examiner

AGGREGATING AND ROUTING SENSOR DATA AT A COMMUNITY SENSOR-COORDINATING ENTITY

TECHNICAL FIELD

This disclosure generally relates to sensor networks.

BACKGROUND

A sensor network may include distributed autonomous sensors. Uses of sensor networks include but are not limited to military applications, industrial-process monitoring and control, machine health monitoring, environment and habitat monitoring, utility usage, healthcare applications, home automation, and traffic control. A sensor in a sensor network is typically equipped with a communications interface, a controller, and an energy source (such as a battery).

DESCRIPTION OF EXAMPLE EMBODIMENTS

Overview

Figure 1:
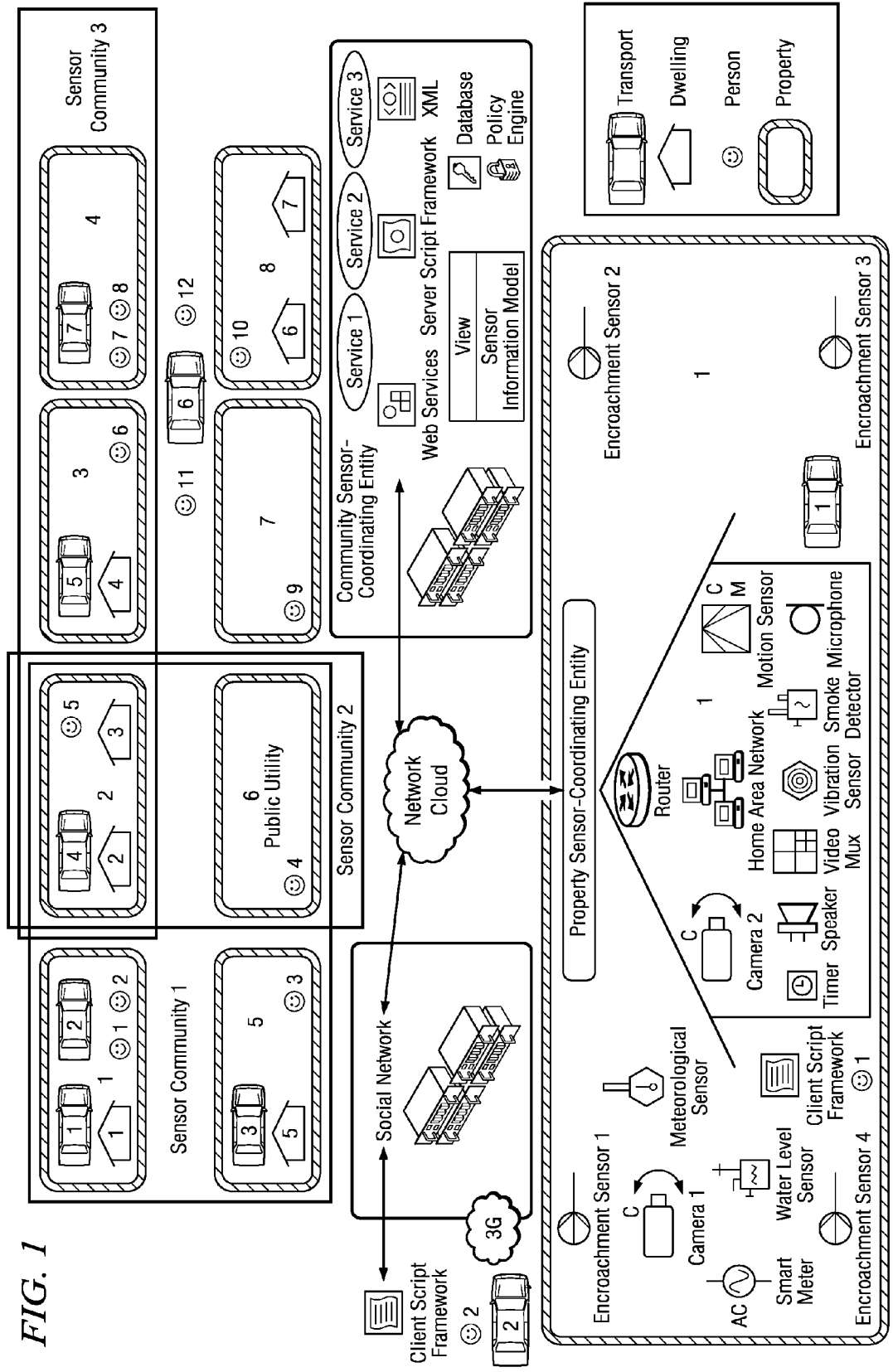
FIG. 1 illustrates example sensor communities.

In one embodiment, a method includes receiving sensor data from multiple sensors associated with multiple persons; for each of the sensors, identifying the person associated with the sensor; determining whether the sensor data are valid; and, for the sensor data that are valid, aggregating them based on the associations of their sensors with the persons and routing them to one or more sensor-application-service providers based on associations of the persons with the sensor-application-service providers.

Description

Characterizing and monitoring sensor data transported by a sensor network may facilitate monitoring the health of the sensor network. Herein, reference to the "health" of a sensor network encompasses, where appropriate, substantially preventing sensor or other data from malfunctioning sensors from entering the sensor network; substantially preventing sensor or other data from malicious rogue sensors or other devices from entering the sensor network; substantially ensuring that sensors being added to the sensor network as associated with a user are valid with respect to the user; substantially ensuring that sensors being added to the sensor network as associated with a user are valid with respect to the user; substantially ensuring that sensors being added to a sensor community as associated with a user are valid with respect to the user; proper functioning of sensors and other equipment in the sensor network, such as property sensor-coordinating entities, community sensor-coordinating entities, and sensor-application services; or one or more other aspects of the health of the sensor network.

Particular embodiments characterize sensor data transported by a sensor network according to specifications logically associated with user identities, as described below. Particular embodiments classify sensors to help assign weight to data indicating the health of a sensor network. As an example and not by way of limitation, a sensor located at a residence of a user may be characterized as transmitting data only at low speed and only by broadcast. Particular embodiments may determine whether the sensor is transmitting data at a rate and interval specified by the owner or operator of the sensor and, if the sensor is transmitting data at a rate or interval not specified by the owner or operator of the sensor, then flag the sensor as potentially distrusted. Particular embodiments monitor sensor data using a community sensor-coordinating entity that includes potentially distributed virtual entities in a sensor network (which may include software processes) representing persons, properties, sensors, communities, and coordinating and transformational services, as described below. In addition or as an alternative, particular embodiments monitor sensor data using property sensor-coordinating entities, as further described below. In particular embodiments, a property sensor-coordinating entity may associate sensors of known types in a sensor network to a specific user.

In particular embodiments, a sensor includes one or more devices that measure or otherwise sense one or more physical quantities and convert the sensed physical quantities into or generate based on the sensed physical quantities one or more signals. Example physical quantities include but are not limited to chemical concentration, electrical fields, gravity, humidity, light, location, magnetic fields, motion, orientation, pressure, shear stress, sound, temperature, tension (or compression), torsion, and vibration. A signal may be a digital or analog electrical signal. Example sensors include but are not limited to an audio sensor, electricity meter, gas meter, Global Positioning System (GPS) locator, motion detector, potentiometer (which may, for example, operate as a fuel gauge), pressure sensor (which may, for example, operate as an altimeter, barometer, depth sensor, flow sensor, or leak sensor), still or video camera, thermometer, and water meter. A sensor may include one or more sensors and may be unitary or distributed. Although this disclosure describes and illustrates particular sensors, this disclosure contemplates any suitable sensors. Where appropriate, a sensor may include one or more devices that send, receive, or forward information (such as sensor data) over a communication channel. In particular embodiments, sensor data are one or more signals (or representations of such signals) that one or more sensors have converted one or more sensed physical quantities into or generated based on one or more sensed physical quantities.

In particular embodiments, a community sensor-coordinating entity has a web-service-oriented, extensible software framework for constructing virtual sensor communities. With personal sensors and sensor networks becoming more available and pervasive, such a framework may facilitate management of the resulting sensor data. Particular embodiments may also facilitate user participation in sensor communities and user access to sensor-application services associated with sensor communities. In particular embodiments, a sensor community may be a community of users that have a shared interest in particular subject matter or sensor-application service that sensor data facilitate the study of, provide, or otherwise have a relationship to. Herein, reference to a sensor community may encompass a virtual counterpart (which may include one or more software processes (or threads of execution)) running at a community sensor-coordinating entity (as described below), and vice versa, where appropriate. A sensor community may be similar in one or more respects to a social networks. As such, sensor communities may provide integration opportunities with other non-sensor-related social-network applications. This disclosure contemplates any suitable sensor community. In particular embodiments, a sensor-application service may be an information or a collection of application services provided to users or others (possibly on a paid basis) that involves sensor data as input. Similarly sensor owners may Be paid for providing their sensor data to sensor-application-service providers. This disclosure contemplates any suitable sensor-application service.

A community sensor-coordinating entity may facilitate a sensor network accommodating the substantially spontaneous generation of sensor communities, which in turn may facilitate the provision of sensor-application services, as described below. As an example and not by way of limitation, when a user joins a sensor community that permits the aggregation of sensor data from multiple users in a cooperative manner, particular embodiments may construct network resources at a community sensor-coordinating entity to coordinate the participation of the user in the sensor community. A community sensor-coordinating entity may also facilitate the distribution of sensor-data aggregation, policing, and routing functionality in a sensor network, as described below. The extensibility of a community sensor-coordinating entity in particular embodiments facilitates assembling relationships among software processes for sensor-data aggregation, policing, and routing, as well as coordinating and transformational services. In particular embodiments, coordinating and transformational services are software processes for directing sensor data to sensor-application services for handling, as described below. Particular embodiments may process sensor data in a sensor network to get various sensor data from various sources to various systems responsible for providing particular sensor-application services with respect to particular sensor data, such as for example particular weather services with respect to particular meteorological sensor data. Particular embodiments provide methods and systems for the receipt and handling of sensor data by providers of sensor-application services.

Particular embodiments use a sensor information model to validate sensor data. The sensor information model may employ associative characteristics, such as for example the owner or operator of the sensor, the sensor type, the property where the sensor is located, and the sensor-community involvements of the owner or operator of the sensor. These associative characteristics may help protect against rogue or improperly operating sensors, as described below. In particular embodiments, a community sensor-coordinating entity, a property sensor-coordinating entity, or both may use one or more portions of a sensor information model that employs these associative characteristics. This disclosure contemplates any suitable sensor information model and any suitable associative characteristics. Particular embodiments use virtualization, distributed networks, and sensor information models to validate sensor data and provide sensor-application services. Individuals (such as consumers) or organizations (such as businesses or enterprises) may use particular embodiments in their homes or buildings to aggregate large sets of sensor data for sensor-application services. Value-added resellers or information technology (IT) or telecommunications service providers may use particular embodiments to provide subscription-based services for sensor applications to individuals or organizations.

FIG. 1 illustrates example sensor communities. As an example and not by way of limitation, a sensor community may encompass one or more users, properties, dwellings, or vehicles. A user may be one or more individuals or organizations, where appropriate. Reference to a user may encompass a mobile device (such as a smartphone) carried by the user, where appropriate. Users may have sensors on their properties, dwellings, vehicles (or transports), or persons. A user may have or otherwise be associated with one or more properties. A property may be land, a fixture to the land, or both, where appropriate. A user may belong to or otherwise be associated with one or more communities, such as for example, a neighborhood, family, church, municipality, school, club, or other suitable community. Different users associated with the same property may be associated with different communities. A user may occupy a fixed dwelling, such as for example a house, apartment, condominium, or other suitable dwelling. A user may have or otherwise be associated with one or vehicles, such as for example a car, boat, airplane, helicopter, bike, motorcycle, recreational vehicle (RV), or other suitable vehicle. A user may reside in a vehicle associated with the user. In particular embodiments, a user owns all sensor data generated by sensors on the properties, dwellings, vehicles, or person of the user. In particular embodiments, users transact with each other with respect to their sensor data based on their community relationships. Although this disclosure describes and illustrates a particular arrangement of particular sensors on particular properties, dwellings, vehicles, and persons of particular users, this disclosure contemplates any suitable arrangement of any suitable sensors on any suitable properties, dwellings, vehicles, or persons of any suitable users. Although this disclosure describes and illustrates sensors on properties, dwellings, vehicles, or persons of users, this disclosure contemplates sensors at any suitable locations, not just on properties, dwellings, vehicles, or persons.

One or more property sensor-coordinating entities, community sensor-coordinating entities, social networks, and sensor-application-service providers may communicate with each other over a network cloud. The network cloud may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or another network or a combination of two or more such networks. The network cloud may include one or more network clouds. This disclosure contemplates any suitable network cloud. One or more links may connect a property sensor-coordinating entity, community sensor-coordinating entity, social network, or sensor-application-service provider to the network cloud. In particular embodiments, one or more of the links each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links. In particular embodiments, one or more of the links each include an ad hoc network, an intranet, an extranet, a VPN, a LAN, a WLAN, a WAN, a WWAN, a MAN, a portion of the Internet, a portion of the PSTN, a cellular telephone network, or another link or a combination of two or more such links. A link may include one or more links. This disclosure contemplates any suitable links. Links need not necessarily be the same throughout the system. One or more first links may differ in one or more respects from one or more second links. Although this disclosure describes and illustrates particular connections among community sensor-coordinating entities, dwellings, properties, property sensor-coordinating entities, sensor-application-service-providers, social networks, users, and vehicles, this disclosure contemplates any suitable connections among them. A cellular network may connect one or more users or vehicles to a social network, which may in turn connect them to property sensor-coordinating entities, community sensor-coordinating entities, and other social network over a network cloud. In particular embodiments, one or more links may connect a social network to a client script framework. The client script framework could reside within an intelligent endpoint controller, property sensor-coordinating entity, community sensor-coordinating entity, sensor-application-service provider, or a social-network-application-service provider.

One or more users may each have a personal sensor network that operates according to policies set by the user. A personal sensor network of a user may include the sensors on the properties, dwellings, vehicles, or person of the user and a property sensor-coordinating entity, which may aggregate sensor data from those sensors. A personal sensor network of a user may be self-organizing. In particular embodiments, a personal sensor network includes a home area network (HAN) or other suitable network. The sensors in a personal sensor network may be diverse. As an example and not by way of limitation, the personal sensor network may include one sensor for detecting smoke, another for measuring atmospheric pressure, another for measuring temperature, another for measuring wind speed and direction, another for measuring vibration, another for detecting particular sounds (such as a glass-break detector), another for measuring time, another for measuring electricity usage, another for measuring natural-gas usage, and another for detecting the presence of the user in a particular area. And these sensors may differ from each other in terms of the functionality or operation, such as data transmission.

In particular embodiments, users may monitor their sensor data and participate in deciding how, when, and with whom or with what to share their sensor data. In addition or as an alternative, in particular embodiments, users may have one or more automatic software processes participate in deciding how, when, and with whom or with what to share their sensor data. In particular embodiments, one or more social-network applications may interact with property sensor-coordinating entities, community sensor-coordinating entities, or both, as described below. In particular embodiments, users have control over the privacy of their sensor data. In particular embodiments, users may each have a personal identifier (ID) and property sensor-coordinating entities, community sensor-coordinating entities, or both may use the personal IDs of the users to aggregate sensor data, as described below. In particular embodiments, interactive client-side software programs (which may be accessible to users at their properties or elsewhere) interact with server-side software program using a coordinated software framework managed by the owners of the sensor data.

Particular embodiments provide applications and services to a user to manage access to sensor data; secure sensor data; broker the flow of information (including sensor data) to or from sensors; perform accounting for the provision of sensor data or sensor-application services; or monitor the performance of sensors owned or operated by the user, according to particular needs. In particular embodiments, the architecture of a community sensor-coordinating entity is independent of the sensor-network-technology used to transport sensor data to or from the community sensor-coordinating entity. In particular embodiments, a community sensor-coordinating entity may have a scripting framework and web-service-oriented architecture that provide extensibility. Similarly, in particular embodiments, a property sensor-coordinating entity may have a scripting framework and web-service-oriented architecture that provide extensibility.

In particular embodiments, network equipment (such as, for example, routers or intelligent endpoints) may facilitate the distribution of intelligence across a sensor network. As an example and not by way of limitation, a smartphone with video capability and network access may serve as a control element in a sensor application. In particular embodiments, an end-to-end application framework is built into home gateway routers, fixed and mobile web client applications, and network-core application servers. Particular embodiments may include sensor-specific intelligent endpoint devices, such as for example a remote control for the personal sensor network of a user. As an example and not by way of limitation, such an endpoint device may enable a user to push a button to stop immediately sharing with one or more sensor communities sensor data from biometric sensors associated with the user.

In particular embodiments, there may be incentives for users to have personal sensor networks or to add sensors to their personal sensor networks. As an example and not by of limitation, there may be financial incentives, such as for example tax breaks. As another example, users may receive access to services in return for adding sensors to the personal sensor networks (e.g. the WEATHER CHANNEL (or another suitable entity that may provide weather-related sensor-application services) may supply wind sensors to users and, in return for having access to the sensor data from the wind sensors, provide the users access to premium WEATHER CHANNEL services). As another example, personal sensors that provide biometric monitoring may help users to improve their own health or monitor the health of others, such as an aging parent.

Figure 2:
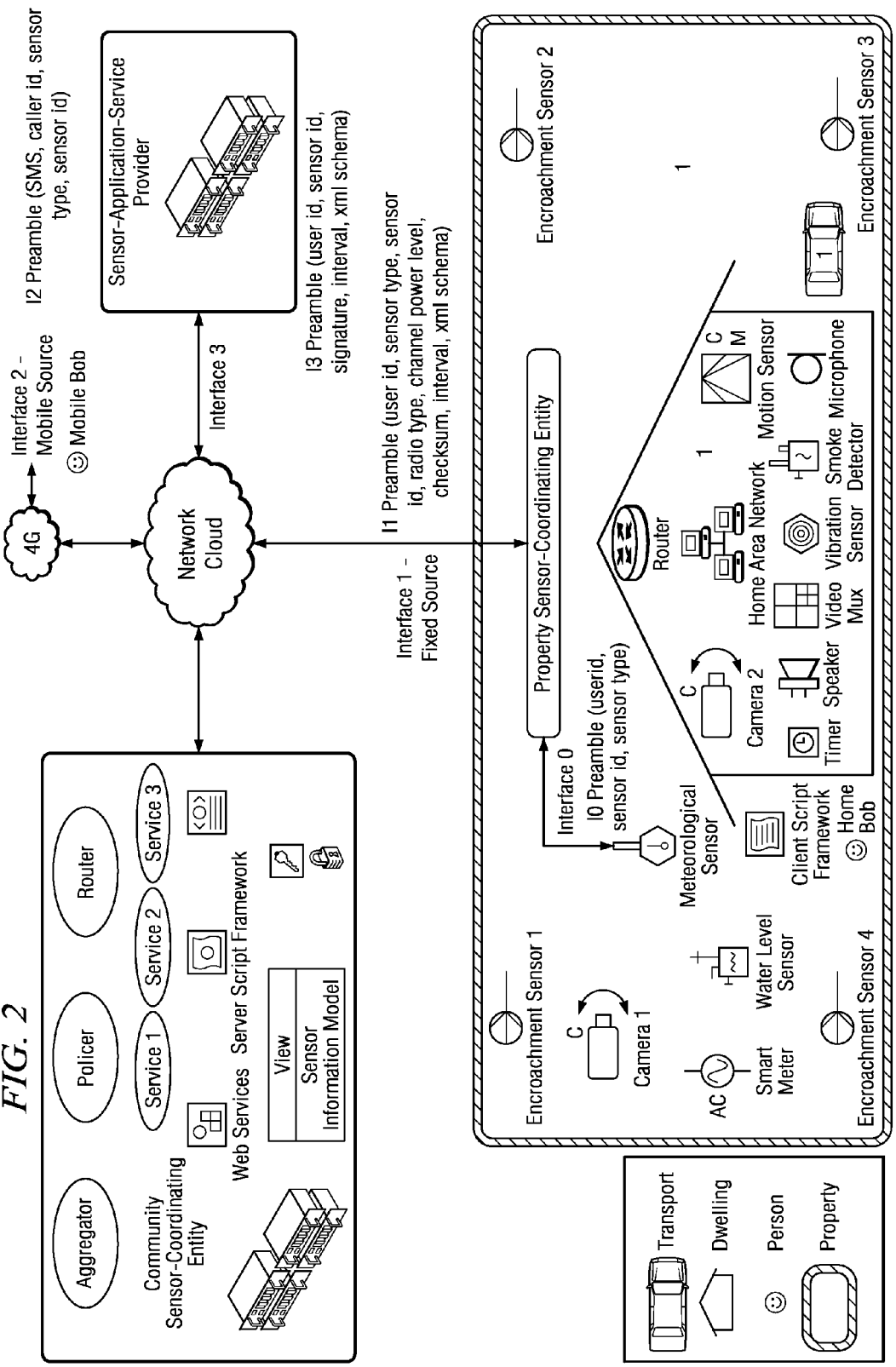
FIG. 2 illustrates example elements and interfaces of an example sensor network for sensor-application services.

FIG. 2 illustrates example elements and interfaces of an example sensor network for sensor-application services. In FIG. 2, there are sensor-coordinating entities at the property, community, and sensor-application-service levels. The community sensor-coordinating entity may associate sensors of known types in a sensor network to specific users. To do this, the community sensor-coordinating entity may store attributes of and relationships among sensors, users, and sensor-application services in a sensor information model. Using the sensor information model, the community sensor-coordinating entity may validate sensor data. In particular embodiments, the community sensor-coordinating entity receives sensor data from fixed or mobile sensors associated with a user, validates them, and delivers them to one or more appropriate sensor-application-service providers. In this role, the community sensor-coordinating entity may help to ensure that only valid and healthy sensor data authorized to a user are collected and processed by sensor-application-service providers.

In FIG. 2, there are different interfaces for different elements in the sensor network. Interface 0 is between sensors and a property sensor-coordinating entity. A community sensor-coordinating entity terminates sensor data from multiple property sensor-coordinating entities using interface 1 and terminates sensor data from mobile sensors using interface 2, which may facilitate the handling of sensor data from multiple properties and users. The community sensor-coordinating entity then routes validated sensor data using interface 3 to sensor-application-service providers. In particular embodiments, each of these points in the sensor network—property sensor-coordinating entity, community sensor-coordinating entity, and sensor-application-service provider—may employ similar algorithms implemented as software processes to determine the validity of sensor data.

Consider a user who has a collection of meteorological sensors at the property level that employ a specific communication technique that is privately known. This may be done to help block sensor data from potential rogue sensors. These rogue sensors may be sensors in a neighbor's yard or may represent an attempt by a hacker to inject unauthorized data into the users' personal sensor network. To help block rogue sensor data, particular embodiments use a sensor information model (which may, as an example and not by way of limitation, be stored in one or more local or remote, unitary or distributed databases or other data stores associated with a community sensor-coordinating entity) that includes associations between users and sensors with specific characteristics. Components of the sensor information model may be used at distributed points in the sensor network to help determine whether data being received at the property, community, or sensor-application-service level is valid. In particular embodiments, the community sensor-coordinating entity may be centrally located with respect to the sensor network. This may enable one or more centralized servers to facilitate the creation, maintenance, and coordinated use of the sensor information model to help validate sensor data.

Particular embodiments use preamble information and encoding techniques to validate sensor data. At the property level, preamble information may indicate a power level, sensor ID, and sensor type and may be sent along with sensor data. Using this preamble information, the property sensor-coordinating entity may determine whether one or more transmission characteristics of received sensor data are appropriate. Continuing with the example of a user who has a collection of meteorological sensors, a multiplexor (or mux) may collect sensor data from temperature, wind, and humidity sensors, encode the sensor data, and transmit the sensor data to a receiver in the user's house using FM radio on a predetermined frequency and time-division multiplex (TDM) interval. An attempt may be made to keep this information private. The property sensor-coordinating entity may determine in part or in whole whether the sensors are meeting the transmission characteristics for those sensors associated with the user. In addition or as an alternative, the property sensor-coordinating entity may hand this responsibility in part or in whole to the community sensor-coordinating entity. In this hierarchy, the property sensor-coordinating entity may fulfill a role of helping to ensure the validity of sensor data by using Extensible Markup Language (XML) encoding techniques, applying a checksum or signature certificate of the user to the sensor data. Different levels in the hierarchy may use different validation techniques.

Figure 3:
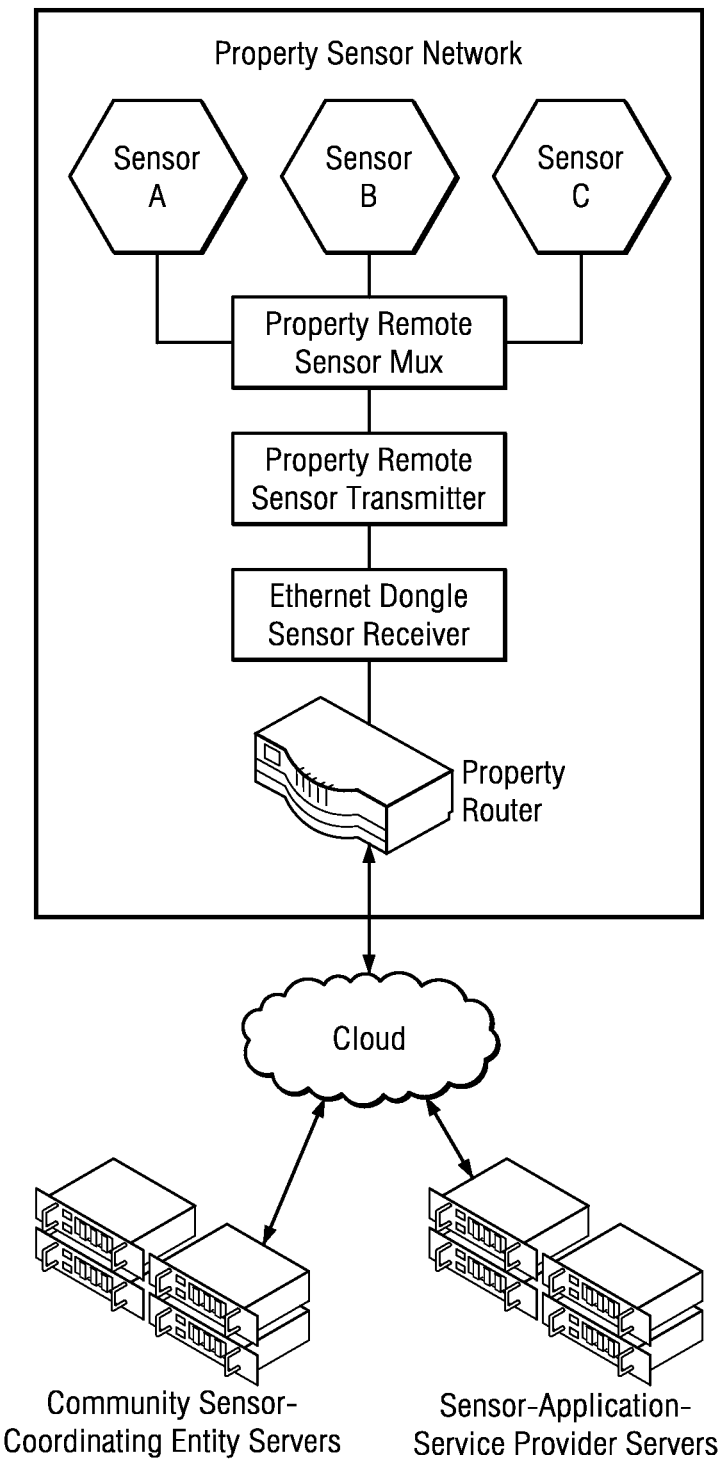
FIG. 3 illustrates an example property sensor network.

FIG. 3 illustrates an example property sensor network. The property sensor network includes sensors, a property remote-sensor mux, a property remote-sensor mux transmitter (which may be a radio-frequency (RF) transmitter), an Ethernet dongle remote-sensor radio receiver, and a property sensor-coordinating entity (which in particular embodiments may be a router or other suitable customer premises equipment (CPE)). The property sensor-coordinating entity may communicate through a network cloud with a community sensor-coordinating entity or one or more sensor-application-service providers. Distributed around the property may be a collection of sensors. These sensors may be multiplexed together at a remote unit and then transmitted to the home router using radio-transmission techniques, such as for example Wi-Fi or FM or AM radio. The multiplexed sensor data may be received by a receiver built as an adapter dongle plugged into an Ethernet port of a router (or integrated into the router). The router may validate the sensor data (which may be limited to low-level validation) and then communicate the sensor data, if validated, to the community sensor-coordinating entity. The community sensor-coordinating entity may further validate the sensor data before communicating it to one or more sensor-application-service providers, which may yet even further validate the sensor data. Although this disclosure describes and illustrates sensors being connected to a sensor network through a property sensor-coordinating entity, this disclosure contemplates sensors being connected to a sensor network in any suitable manner. As an example and not by way of limitation, one or more sensors (whether fixed or mobile) may be connected directly to the sensor network through a local area network (LAN) not associated with a personal sensor network or through a wide area network (WAN). Moreover, this disclosure contemplates the validation of sensor data being performed at any suitable computing platforms distributed throughout the sensor network.

As described above, particular embodiments align policing functions based on user identities. As an example and not by way of limitation, a user's meteorological sensors may use AM radio at low power to communicate to an HAN at intervals and frequencies determined by their association with the user. The user may police the health of the user's sensors from his smartphone or delegate this policing in whole or in part to a network policing entity (which may reside at a community sensor-coordinating entity or a property sensor-coordinating entity). Although this disclosure describes and illustrates particular policing using particular patterns based on user identity, this disclosure contemplates any suitable policing using any suitable patterns based on user identity. If a sensor behaves in a manner different from a pattern associate with the operator or owner of the sensor, particular embodiments may flag the sensor as distrusted. As an example and not by way of limitation, a light-weight health pattern for meteorological sensors associated with a user may be four bits long. Two bits may indicate power (e.g. low, high, normal, off), another bit may indicate pattern alert, and another bit may indicate the detection of data corruption. This disclosure contemplates the identity of a user being stored in any suitable manner. As an example and not by way of limitation, the owner or operator of a sensor may associate it with the identity of the owner or operator. As another example, a sensor may be pre-programmed with the identity of a user. The identity of a user may be embedded in a sensor. In addition or as an alternative, there may be a finite number of pattern parameters the values of which a community sensor-coordinating entity or a property sensor-coordinating entity may determine based one the identity of a user. Sensors in a user's yard may be "dumb" devices that aggregate into a multiplexor (mux) that uses a radio to transmit to HAN equipment in the user's house. The mux may manipulate the pattern at the sensors and at the mux based on an algorithm (which may be implemented by a software script) determined by the identity of the user.

The policing functions of the sensor network work to help ensure that only sensor data from the sensors associated with a user (and not from rogue or otherwise invalid sensors) make their way up to the user's sensor communities. As described above, in particular embodiments, an architecture for accomplishing this includes virtual entities (which may be data, software processes, or both) representing (1) the user, (2) properties associated with the user, (3) sensor communities associated with the user, and (3) sensors associated with the users. These virtual entities may be associated with the each other into relationships of interest in a sensor information model, used by a community sensor-coordinating entity or other elements of the sensor network. Consider as an example sensor type sensors along a property line to detect encroachment. These sensors may use radio signals to communicate their sensor data to an aggregation point. The aggregation point may collect the sensor data and perform validation and aggregation on the sensor data, which would eventually be communicated up to an infrastructure (e.g. a community sensor-coordinating entity) for creating and maintaining a virtual world for the user associated with the sensors.

Consider as another example sensor type meteorological sensors. As described above, validating sensor data may involve, at least in part, attempting to ensure that the sensors being associated with a user or being added to one or more sensor communities associated with the user are valid to the user (e.g. preventing the user's neighbor's sensors or malicious rogue sensors from being associated with the user or being added to a virtual community associated with the user). A community sensor-coordinating entity (which may in particular embodiments reside in a network cloud) may include a sensor information model of the user that describes the user, properties associated with the user, and sensor communities associated with the user. The community sensor-coordinating entity may use the sensor information model to validate the origin of particular sensor data.

Referring again to FIG. 2, as an example and not by way of limitation, interface 0 is between a sensor and a property sensor-coordinating entity. Along with its sensor data, a sensor may communicate across interface 0 a preamble that facilitates validation of its association with a user. The preamble may indicate a user ID, sensor ID, and sensor type. A sensor information model of a user may include information identifying the kinds of sensors that are likely to be associated with the user (e.g. "Jeff is interested in weather tracking, so meteorological sensors on his property are okay"). The property sensor-coordinating entity may perform aggregation (among the sensors on the property) and local policing (e.g. to help validate the sensor data coming in) and communicate sensor data up to a community sensor-coordinating entity. The community sensor-coordinating entity may perform additional aggregation and policing on the sensor data and route them to sensor-application-service providers, which may perform yet additional policing. Interface 1 is between a property sensor-coordinating entity (which may be fixed-source) and the network cloud. Aggregated sensor data communicated from the property sensor-coordinating entity to the network cloud may, in particular embodiments, have an XML-over-HTTP (Hypertext Transfer Protocol) or other suitable format. A preamble to sensor data from a property sensor-coordinating entity may include (1) user ID, (2) sensor type, (3) sensor ID, (4) radio type, (5) channel, (6) power level, (7) checksum, (8) interval, and (9) XML schema. Interface 2 is between a mobile source (e.g., a smartphone associated with a user) and the network cloud. The mobile source may communicate sensor data to the network cloud by Short Message Service (SMS). A preamble to sensor data from a mobile source across interface 2 may include (1) SMS, (2) caller ID, (3) sensor type, and (4) sensor ID. Caller ID may associate the sensor data with a user. A community sensor-coordinating or other entity may use the sensor information model to perform validation on coming across interface 2 sensor data based on this preamble information. Interface 3 is between a community sensor-coordinating entity and a sensor-application-service provider. This disclosure contemplates the use of any suitable protocol from a sensor, whether fixed or mobile. As an example and not by way of limitation, a fixed source may use SMS or a mobile source may use XML over HTTP to communicate sensor data, along with preamble information. In addition or as an alternative, a fixed sourced or a mobile source may use either XML over HTTP, SMS, or both, where appropriate. Herein, reference to sensor data may encompass corresponding preamble information, where appropriate.

In particular embodiments, a property sensor-coordinating entity may be realized as an integrated part of a home or small-business router with additional peripheral hardware and software. This disclosure contemplates a property sensor-coordinating entity including any suitable hardware, software, or both. Where appropriate, a community sensor-coordination entity may be unitary or distributed, span multiple locations, or span multiple machines. Hierarchically, a property sensor-coordinating entity may be a downstream element with respect to a community sensor-coordinating entity. In particular embodiments, sensor multiplexing and communication equipment present on the property and peripheral to the router may be considered part of a property sensor-coordinating entity. A property sensor-coordinating entity may have as its primary functions obtaining, validating, and routing sensor data to a community sensor-coordinating entity. Validation services at a property sensor-coordinating entity may work together with validation services at a community sensor-coordinating entity. In particular embodiments, a property sensor-coordinating entity may analyze one or more physical-layer communication characteristics of sensor data to provide validation services. As an example and not by way of limitation, the property sensor-coordinating entity may check to see if a sensor associated with a user is operating on the correct timeslot or frequency.

A property sensor-coordinating entity may receive inputs across interface 0 from downstream sensors (or sensor-mux equipment) and may communicate outputs across interface 1 to an upstream community sensor-coordinating entity. With respect to these inputs and outputs, the property sensor-coordinating entity may perform validation and adaptation on sensor data from interface 0 to interface 1. In the process, the property sensor-coordinating entity may strengthen the validity of sensor data communicated upstream by providing validation data of greater weight. As an example and not by way of limitation, downstream sensor data may be communicated up to the property sensor-coordinating entity with simple user-ID parameters and binary encoding and the property sensor-coordinating entity may strengthen the validity of the sensor data at interface 1 by providing XML encoding, checksums, or a public-key certificate authenticating the user to the sensor data. In this role, property sensor-coordinating and community sensor-coordinating entities may cooperate with each other to provide distributed services for validating sensor data before they are communicated to upstream sensor-application-service providers. Different embodiments may use different techniques for associating a sensor to a user, depending on cost constraints. These techniques may include embedding user-ID information in sensors or in distributed entities for multiplexing, validating, or routing sensor data (such as, for example, a property sensor-coordinating entity). An embedded user ID may be an access credential (e.g. username and password) or a public-key digital certificate (which may comply with International Telecommunication Union Telecom Standardization (ITU-T) Recommendation X.509) issued and signed by a certificate authority. Other techniques include pattern recognition of user attributes like fingerprints or retinal scans. Although this disclosure describes and illustrates particular techniques for associating a sensor to a user, this disclosure contemplates any suitable techniques for associating a sensor to a user.

Figure 4:
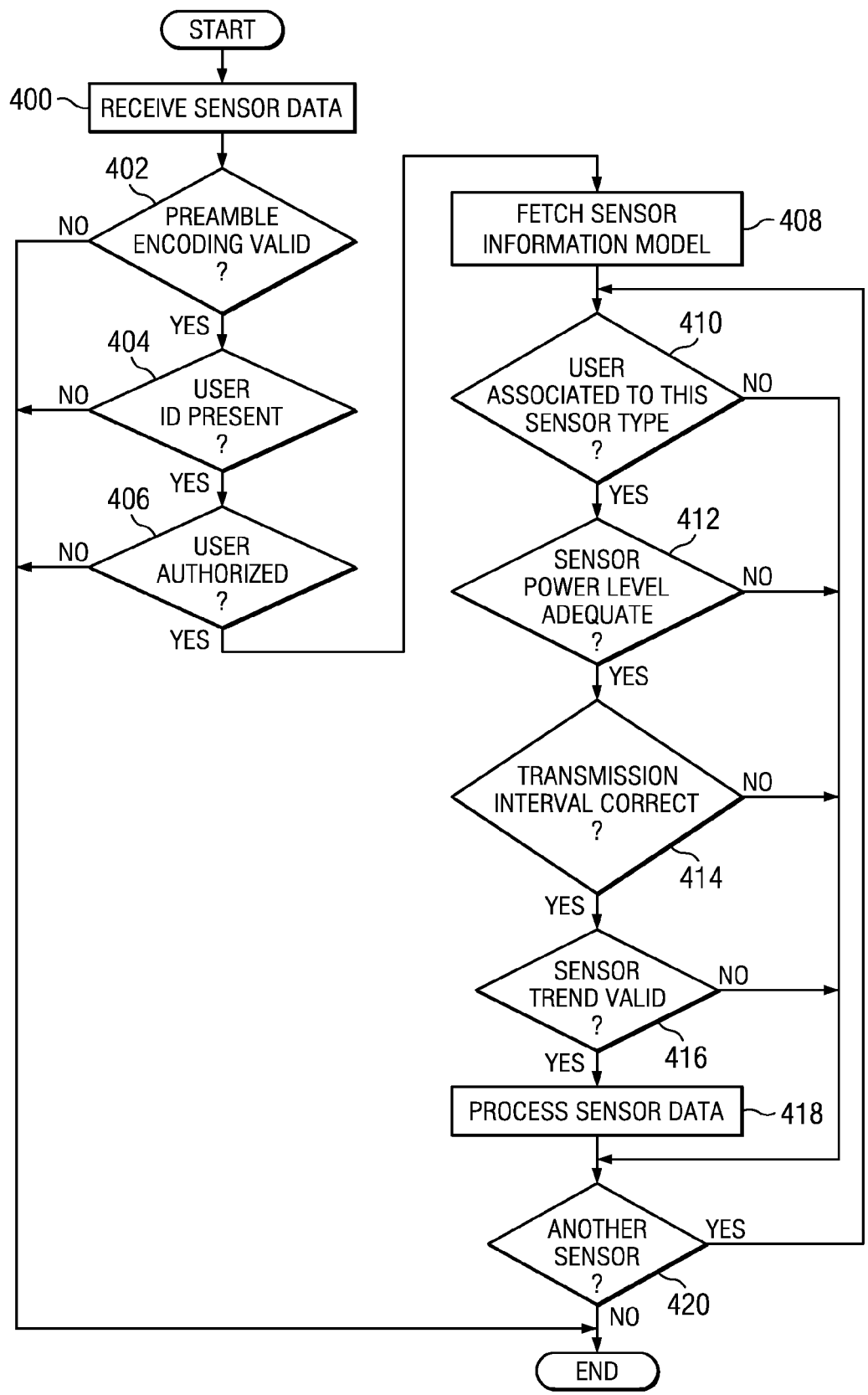
FIG. 4 illustrates an example method for validating sensor data.

FIG. 4 illustrates an example method for validating sensor data. The method may start at step 400, where a community sensor-coordinating entity (which may reside at one or more servers) receives sensor data. Although FIG. 4 describes and illustrates a community sensor-coordinating entity receiving the sensor data and carrying out the method of FIG. 4, this disclosure contemplates any suitable equipment carrying out any suitable steps of the method of FIG. 4. Moreover, this disclosure contemplates any suitable steps of the method of FIG. 4 being distributed across any suitable number of computing platforms at any suitable number of locations. At step 402, the community sensor-coordinating entity determines whether the sensor data has a preamble with valid encoding. In particular embodiments, the community sensor-coordinating entity may use one or more proprietary binary structures or standard text-based structures (such as, for example, XML) in making this determination. At step 404, if the community sensor-coordinating entity is able to decode the sensor data, the community sensor-coordinating entity determines whether a user ID is present in the preamble, identifying the user the sensor data is associated with. At step 406, the community sensor-coordinating entity determines whether the user identified by the user ID is authorized. At step 408, if the user is authorized, the community sensor-coordinating entity accesses a sensor information model of the user. At step 410, the community sensor-coordinating entity determines, based at least in part on the sensor information model, whether the user is associated with (e.g. authorized to use) a sensor of the sensor type indicated by the preamble. At step 412, the community sensor-coordinating entity determines, based at least in part on the sensor information model, whether the power level indicated by the preamble is adequate. At step 414, the community sensor-coordinating entity determines, based at least in part on the sensor information model, whether a transmission interval or type indicated by the preamble is valid. At step 416, the community sensor-coordinating entity determines, based at least in part on the sensor information model, whether the sensor data matches a valid trend for the sensor. At step 418, if the sensor data satisfies all the preceding checks, the community sensor-coordinating entity processes the sensor data for communication to and further handling by one or more sensor-application-service providers. At step 420, if there is sensor data from another sensor, the method returns to step 410. In this way, the community sensor-coordinating entity may perform these checks for every sensor that is present in the sensor data received at step 400. At step 420, if there is no sensor data from another sensor, the method may end. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components carrying out particular steps of the method of FIG. 4, this disclosure contemplates any suitable combination of any suitable components carrying out any suitable steps of the method of FIG. 4.

In particular embodiments, a community sensor-coordinating entity may provide computing resources for users subscribed to sensor-application services using a software framework that supports dynamic construction of computing resources on a just-in-time basis, as users require services. Where appropriate, a community sensor-coordination entity may be unitary or distributed; span multiple locations; span multiple machines; span multiple datacenters; or reside in a cloud, which may include one or more cloud components in one or more networks. As described above, a community sensor-coordinating entity may facilitate a sensor network accommodating the substantially spontaneous generation of sensor communities, which in turn may facilitate the provision of sensor-application services, as described below. As an example and not by way of limitation, when a user joins a sensor community that permits the aggregation of sensor data from multiple users in a cooperative manner, particular embodiments may construct network resources at a community sensor-coordinating entity to coordinate the participation of the user in the sensor community. In particular embodiments, sensor communities may operate better with coordination-framework software at the individual, property, and community level. When a sensor community is created, a dynamic topology of distributed virtual machines (VMs) for the coordination of community sensor-application services may be created specifically for that sensor community. A sensor community may be small-scale and local or globally distributed. In particular embodiments, a software framework at a community sensor-coordinating entity may construct a virtual topology to serve a user as the user joins new sensor communities where sensor-coordination is beneficial. In particular embodiments, one or more unified computing system (UCS) platforms may provide one or more services of a community sensor-coordinating entity. An IT service provider may operate the UCS platforms.

Figure 5:
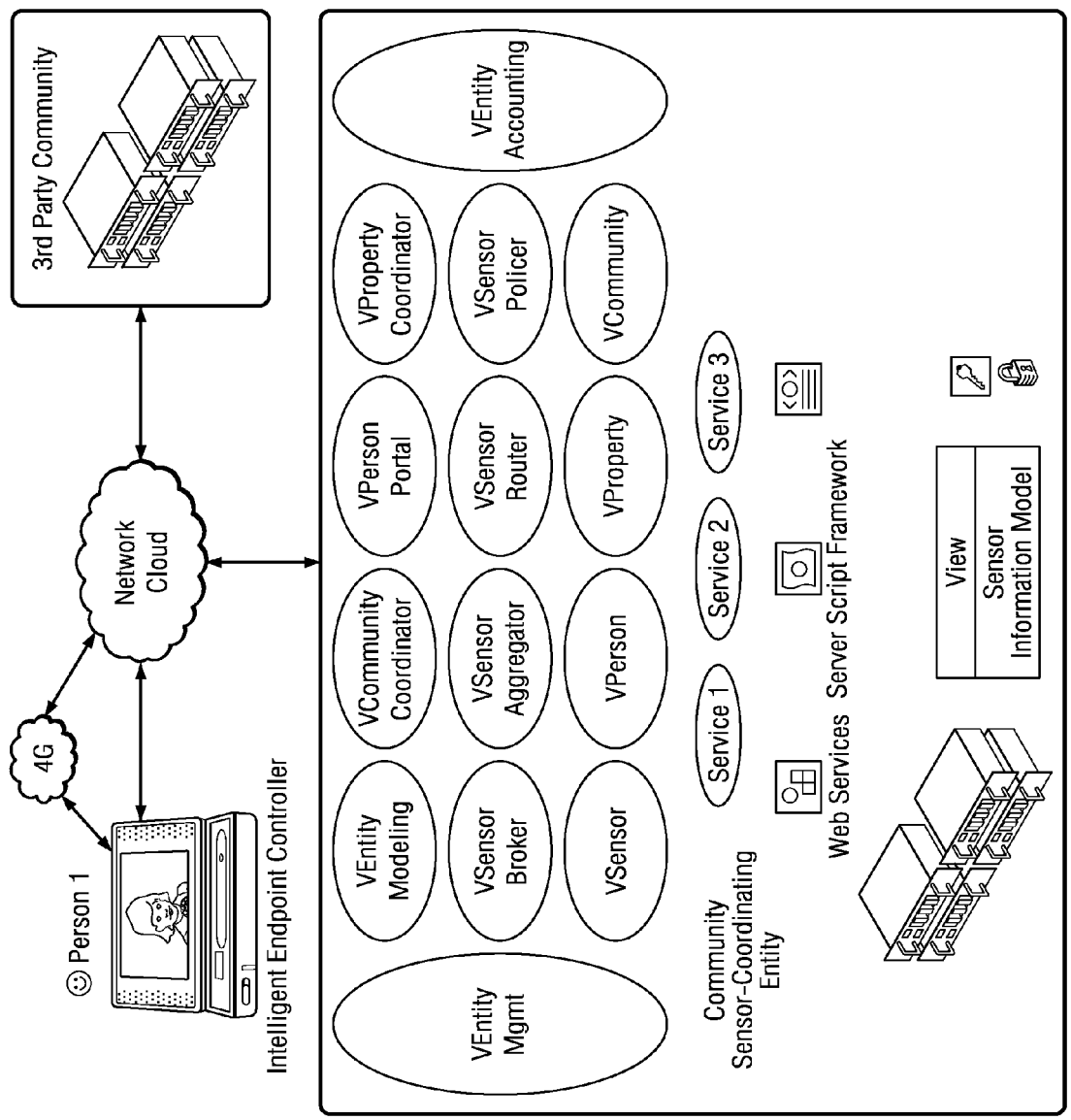
FIG. 5 illustrates an example community sensor-coordinating entity.

FIG. 5 illustrates an example community sensor-coordinating entity, which may provide a dynamic virtual sensor-community framework. To join a sensor community, a user may use a client application that communicates with the community sensor-coordinating entity (which may for example run on one or more cloud-based UCSs). The client application may leverage an application programming interface (API) that exposes interfaces enabling authorized users to create dynamically software processes for providing a sensor-application service. API events may spawn scripted threads of execution to construct a software topology for the sensor-application service. Through this interaction between the client and the community sensor-coordinating entity, particular embodiments may construct and spawn software processes corresponding to the following abstract virtual entities: VSensor, VPerson, VProperty, and VCommunity. Herein, where appropriate, the letter V at the beginning of a label may indicate one or more software processes (or threads of execution) operating as a virtual counterpart to an entity corresponding to the label. In particular embodiments, the creation of these software processes may be data-driven, using one or more sensor information models, as described above. As the community sensor-coordinating entity receives requests to participate in sensor communities, the community sensor-coordinating entity may refer to one or more sensor information models to determine an optimal location to spawn an instance of a software process (or thread of execution) to facilitate the requested participation. As an example and not by way of limitation, particular embodiments may spawn software processes associated with the sensor (VSensor), person (VPerson), and property (VProperty) in close proximity to the property. Alternatively, it may be more efficient to spawn community (VCommunity) or these previously defined software processes in a distributed computing environment in close proximity to a sensor-application-service provider that will provide sensor-application services to the user in response to the requested participation. Once spawned, the software processes may work cooperatively with each other to provide sensor-application services authorized for the user.

In FIG. 5, each oval represent one or more software processes running on, for example, one or more UCS platforms. As an example and not by way of limitation, VPerson may be a set of software processes dedicated to the user Jeff running in the UCS environment; VProperty may be a set of software processes dedicated to a property associated with the user Jeff; VCommunity may be a set of software processes dedicated to managing the relationships that the user Jeff has with third-party entities that may provide one or more sensor-application services (e.g. the Institute of Electrical and Electronics Engineers (IEEE), the National Aeronautics and Space Administration (NASA), and the WEATHER CHANNEL). A sensor information model (which the community sensor-coordinating entity may maintain) for a user may describe the user, the sensors associated with the user, the properties associated with the user, and the communities that the user is associated with.

Particular embodiments may implement a community sensor-coordinating entity using a distributed virtual computing framework, such as a UCS. In particular embodiments, the underlying operating system (OS) may be LINUX-based. In particular embodiments, the interaction between client applications and web services may use XML-over-HTTP protocols, such as for example Simple Object Access Protocol (SOAP) or Representational State Transfer (REST). The resulting scripted event handlers may use script frameworks such as JavaScript, Hypertext Preprocessor (PHP), Perl, or Python. Particular embodiments may use client-side frameworks for Asynchronous JavaScript and XML (AJAX) interactions, including frameworks such as Dojo or ADOBE FLEX. These frameworks may be deployed on a variety of client platforms including laptops, tablets, and smartphones. An API for a community sensor-coordinating entity may include any suitable interfaces and may supports events such as, for example, creating, deleting, or maintaining a user account; creating, deleting, or maintaining a user profile; creating, deleting, or maintaining a property profile; creating, deleting, or maintaining a sensor profile; creating, deleting, or maintaining a community profile; associating sensors and sensor communities with users and their properties; processing a dynamic request from a user, sensor, or property to join or leave a sensor community; and processing a request from a user to start or stop sensor-application services to the user.

Figure 6:
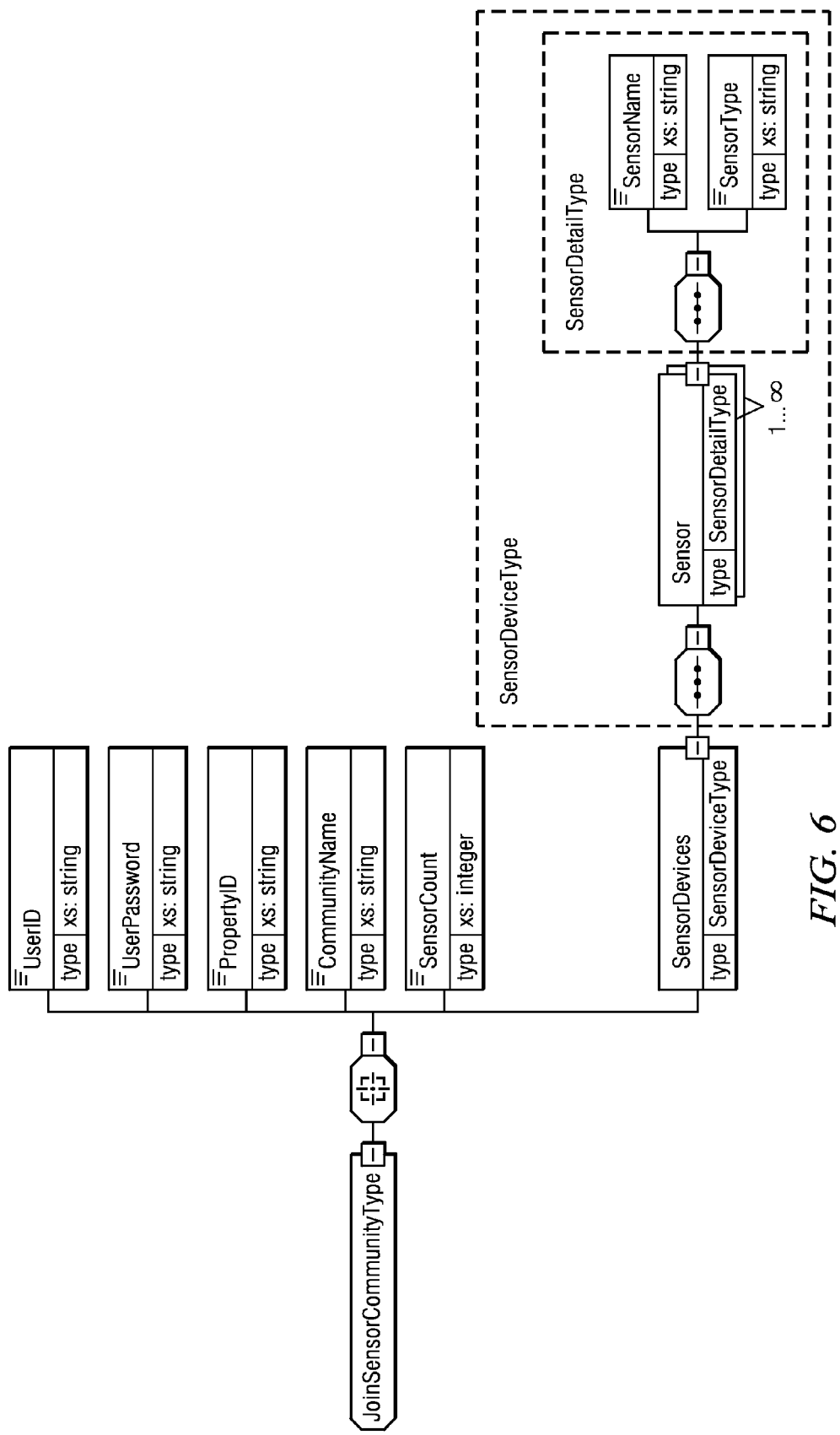
FIG. 6 illustrates an example web service for joining a user to a sensor community.
Figure 7:
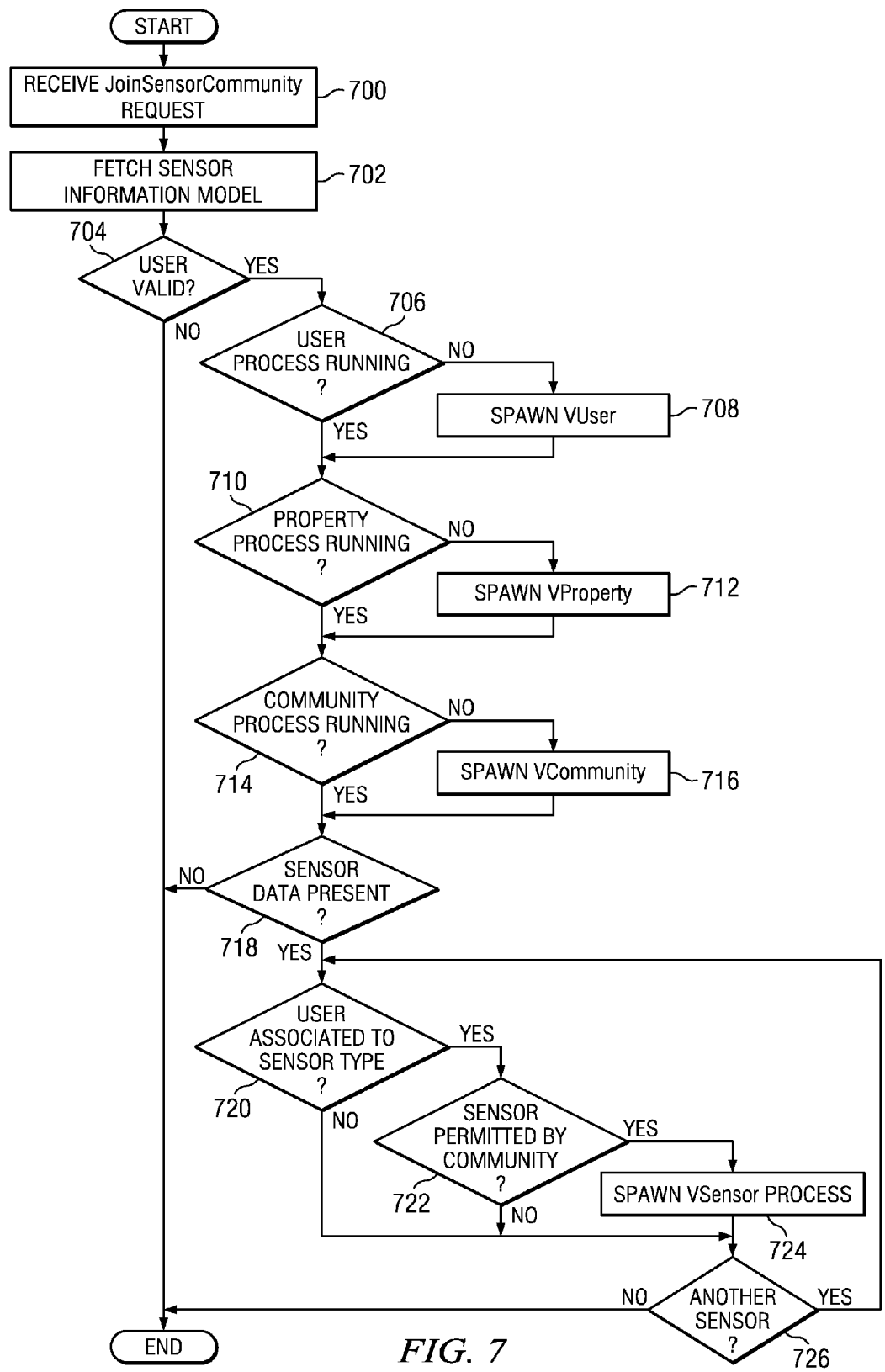
FIG. 7 illustrates an example method for an event handler for joining a user to a sensor community.

FIG. 6 illustrates an example web service for joining a user to a sensor community. In this example, an XML schema provides an interface enabling a user to join a sensor community. The XML schema includes the following elements: UserID; UserPassword; PropertyID; CommunityName; and elements specifying Sensor Name and Type for the sensors being joined to sensor community. FIG. 7 illustrates an example method for an event handler for joining a user to a sensor community, including validation of the user following a decision tree that results in the spawning of software processes for the entities VUser, VSensor, VProperty, and VCommunity. Particular embodiments may also spawn software processes supporting those for VUser, VSensor, VProperty, and VCommunity. These supporting software processes may perform tasks for the routing of sensor data when it arrives at the community sensor-coordinating entity, and particular embodiments may dynamically construct and maintain them.

The method of FIG. 7 may start at step 700, where a community sensor-coordinating entity receives a request from a user to join a sensor community. The user is associated with a property and one or more sensors on the property. At step 702, the community sensor-coordinating entity accesses a sensor information model of the user. At step 704, the community sensor-coordinating entity determines, based at least in part on the sensor information model, whether the user is authorized. At step 706, if the user is authorized, the community sensor-coordinating entity determines whether a software process, VPerson, for the user is currently running. At step 708, if there is not an instance of VPerson currently running for the user, the community sensor-coordinating entity spawns one. At step 710, the community sensor-coordinating entity determines whether a software process, VProperty, for the property is currently running. At step 712, if there is not an instance of VProperty currently running for the property, the community sensor-coordinating entity spawns one. At step 714, the community sensor-coordinating entity determines whether a software process, VCommunity, for the sensor community is currently running. At step 716, if there is not an instance of VCommunity currently running for the sensor community, the community sensor-coordinating entity spawns one. At step 718, the community sensor-coordinating entity determines whether there is any sensor data with the request from the user. At step 720, if sensor data is present, the community sensor-coordinating entity determines, based at least in part on the sensor information model, whether the user is associated with (e.g. authorized to use) a sensor of the sensor type indicated by a preamble to the sensor data. At step 722, if the sensor is properly associated with the user, the community sensor-coordinating entity determines whether a sensor of the sensor type indicated by the preamble to the sensor data is permitted by the sensor community. At step 724, if a sensor of the sensor type indicated by the preamble to the sensor data is permitted by the sensor community, the community sensor-coordinating entity spawns a software process, VSensor, for the sensor that updates one or more routing tables to facilitate routing sensor data to one or more sensor-application-service providers associated with the sensor community. At step 726, if there is sensor data from another sensor, the method returns to step 720. In this way, the community sensor-coordinating entity may perform these checks for every sensor that is present in the sensor data received with the request from the user. At step 726, if there is no sensor data from another sensor, the method may end. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates particular components carrying out particular steps of the method of FIG. 7, this disclosure contemplates any suitable combination of any suitable components carrying out any suitable steps of the method of FIG. 7.

In particular embodiments, processing sensor data in a sensor network to direct the sensor data to an appropriate sensor-application-service provider for proper handling is a function of a collection of related coordinating and transformational services. These services may reside at a community sensor-coordinating entity. The community sensor-coordinating entity may include a pre-constructed software topology, constructed based on users requests. When sensor data arrives at the community sensor-coordinating entity, the software topology may facilitate the routing of the sensor data to one or more sensor-application-service providers. In addition to spawning the software processes VPerson (or VUser), VSensor, VProperty, and VCommunity, particular embodiments may also spawn software processes supporting them, which may perform specific tasks for this routing. Referring to FIG. 5, example software processes supporting VPerson, VSensor, VProperty, and VCommunity include but are not limited to VSensorBroker, VSensorPolicer, VSensorRouter, VSensorAggregator, and VEntityAccounting. In particular embodiments, VSensorBroker brokers agreements between users and sensor-application-service providers. As an example and not by way of limitation, a user may have a collection of meteorological sensor data that the user wants to share with a weather sensor-application service provider. An agreement between the user and the weather sensor-application service provider may impose certain licensing terms on either or both parties. In addition, the agreement may include provisions for payments by one party to the other.

A user's interactions with the community sensor-coordinating entity may result in computing resources being dedicated to routing sensor data as they arrive. Similarly, the user may be enrolled in multiple sensor communities for the same sensor data. The community sensor-coordinating entity may use the sensor information model and the user's interactions with the community sensor-coordinating entity to construct data-driven rules for proper routing of the user's sensor data. As sensor data arrives at the community sensor-coordinating entity, the community sensor-coordinating entity may validate the sensor data and the software process VPolicer may determine whether to drop or route the packets containing the sensor data. If routed, the packets may proceed to the software process VRouter, which may direct the packets to the appropriate sensor-application service providers. Because sensor data may arrive from many sensors belonging to many users (whether from fixed sensors on their properties or from mobile sensors) and may often be headed to common destinations, the software process VAggregator may aggregate the sensor data before they are sent from the community sensor-coordination entity. The software process VAccounting may collect statistics for management of sensor-data routing, including billing users or sensor-application-service providers, according to particular needs. In particular embodiments, a community sensor-coordinating entity operates in one or more respects as an application-layer router dedicated to sensor-data routing and management functions.

Figure 8:
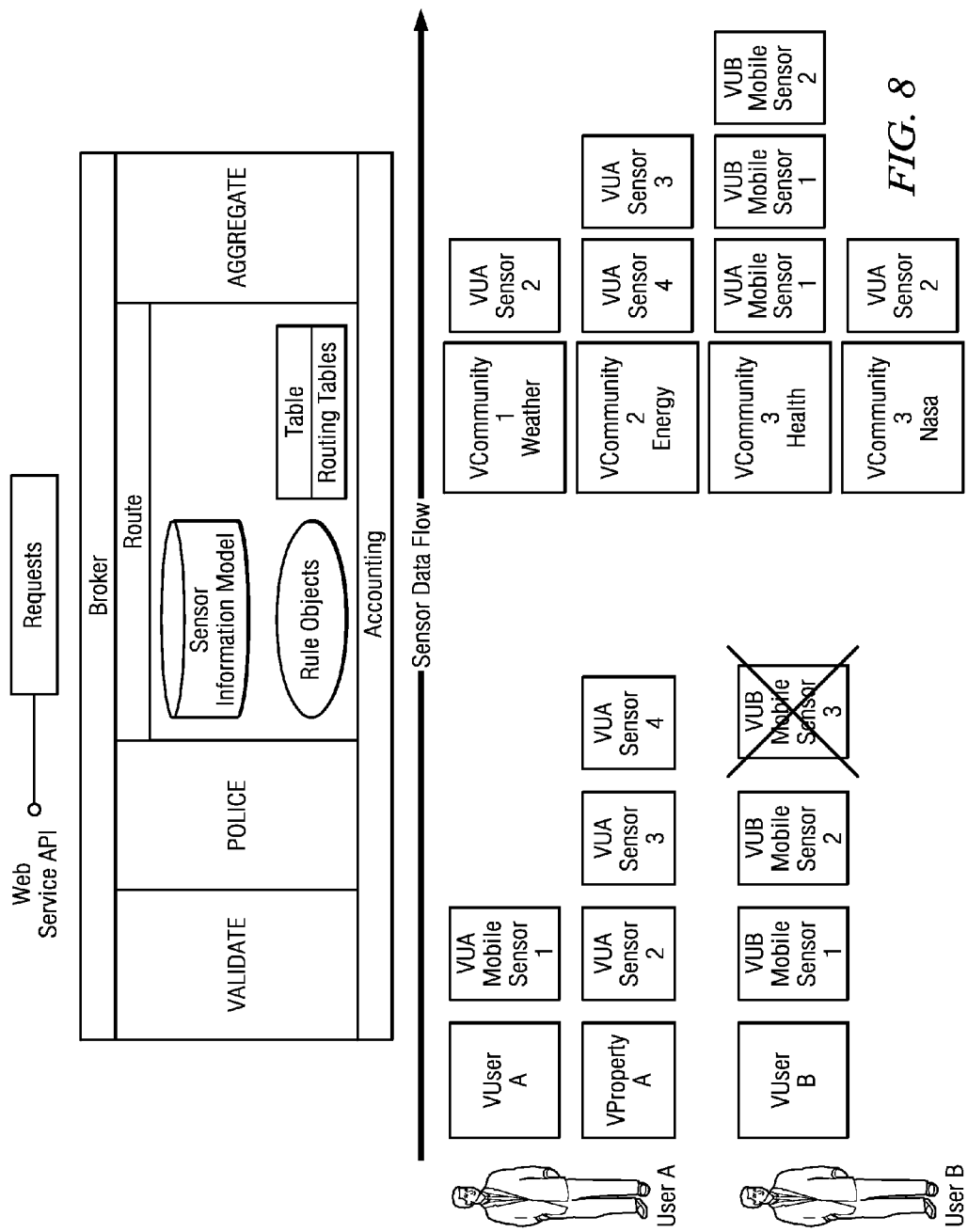
FIG. 8 illustrates an example sensor routing framework.

FIG. 8 illustrates an example sensor routing framework. In FIG. 8, the flow of sensor data moves from left to right from users to sensor-application-service providers, with aggregated sensor data from multiple sources moving toward the sensor-application-service providers (which may operate as remote network servers). The sensor routing framework includes elements for handling the following functions: requests, broker, validate, police, route, aggregate, and accounting. As described above, particular embodiments may also spawn software processes on behalf of the following virtual entities: VPerson (or VUser), VProperty, VSensor, and VCommunity. User-request handlers may use the sensor information model, rule objects, and routing tables to manage the software pipeline for routing incoming sensor data. In the example of FIG. 8, two users, User A and User B, have VUser software processes in a community sensor-coordinating entity. User A has both fixed and mobile sensor data, and User B has only mobile sensor data. Their sensor data is bound for four sensor-application-service providers, each of which may have a VCommunity software process associated with it:

VCommunity 1—Weather
VCommunity 2—Energy
VCommunity 3—Health
VCommunity 4—NASA

User A has biometric health-related sensor data (VUA Mobile Sensor 1), meteorological sensor data (VUA Sensor 2), and energy-management sensor data (VUA Sensors 3 and 4). User B has only biometric health-related sensor data (VUB Mobile Sensors 1, 2, and 3). User A has agreements in place to route his biometric health-related sensor data to a Health. User A also routes meteorological sensor data to two different weather sensor-application-service providers (Weather and NASA). User A also routes his energy-management sensor data to Energy. User B routes all his sensor data to Health, but the policing function is dropping all sensor data from his Mobile Sensor 3. In particular embodiments, the user may have control over all routing of the sensor data of the user and the community sensor-coordinating entity may manage this routing. Although this disclosure describes and illustrates particular routing arrangements, this disclosure contemplates any suitable routing arrangements. As an example and not by way of limitation, particular embodiments may route sensor data from User A to User B. In particular embodiments, the framework of the community sensor-coordinating entity is extensible to additional services, such as the following:

VEntityModeling
VPersonPortal
VCommunityCoordinator
VPropertyCoordinator
VEntityManagement Particular embodiments may provide these extended functions by the community sensor-coordinating entity natively or by third-parties, because of the web-service-oriented, extensible software framework and process-scripting environment of the community sensor-coordinating entity.

Figure 9:
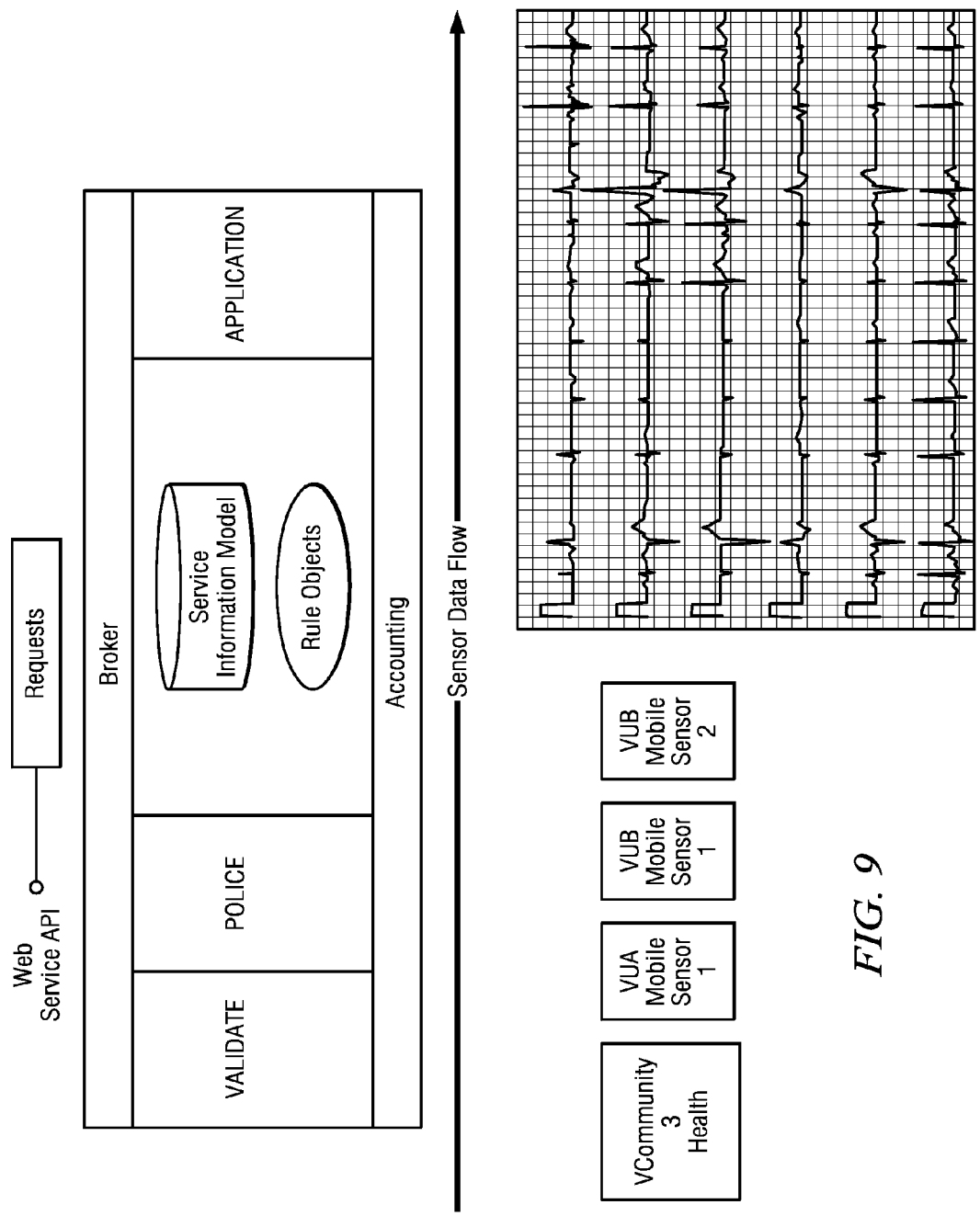
FIG. 9 illustrates an example sensor-application-service provider.

In particular embodiments, a community sensor-coordinating entity communicates aggregated sensor data upstream to a sensor-application service provider. A sensor-application-service provider may work cooperatively with multiple community sensor-coordinating entities to process sensor data with brokered agreements between the sensor-application-service provider and the owners of the sensor data. FIG. 9 illustrates an example sensor-application-service provider. Particular embodiments may implement a sensor-application-service provider on one or more virtual compute platforms, similar in one or more respects to the implementations described above for a community sensor-coordinating entity. For a sensor-application-service provider, a web-service-request framework may front-end a software pipeline that handles incoming sensor data from one or more community sensor-coordinating entities. Although FIG. 9 shows only one sensor community (VCommunity 3), this disclosure contemplates any suitable number of sensor communities communicating sensor data up to the sensor-application-service provider.

In FIG. 9, sensor data arrives from multiple sensors (whether fixed or mobile) associated with multiple users. Sensor data from Mobile Sensor 1 associated with User A (VUA) and Mobile Sensors 2 and 3 associated with User B (VUB) arrives from a virtual sensor-community software process running at a community sensor-coordinating entity remote from the sensor-application-service provider. The sensor-application-service provider may include functions (which may be software processes (or threads of execution)) that cooperatively associate the sensor-application-service provider, the community sensor-coordinating entity, and the users and their sensors with each other. As an example and not by way of limitation, these functions may include a requests function, broker function, validate function, police function, accounting function, and application function. The requests function may process requests from owners of sensor data or clients of the sensor-application-service provider (which may be different from the owners of the sensor data). The broker function may handle licensing or other agreements between owners of sensor data and the sensor-application-service provider. The validate function may authenticate sensor data to agreements with users. The police function may screen out rogue sensor data (or sensor data that does not correspond to an agreement in place). The accounting function may collect statistics for billing for the sensor-application services provided by the sensor-application-service provider. The application function may provide the sensor-application services of the sensor-application-service provider.

The sensor-application-service provider may use a data-driven architecture based on rule objects, a service information model, and web-service-oriented interactions with user client applications to handle incoming sensor data. In the example of FIG. 9, the sensor data may be typical of a heart electrocardiograph (EKG) in which biometric sensor data is received from multiple users and a widget or other user interface (UI) element is provided through a web browser or other portal for viewing. The viewers of the heart data may, but need not, be owners of the corresponding sensor data.

Figure 10:
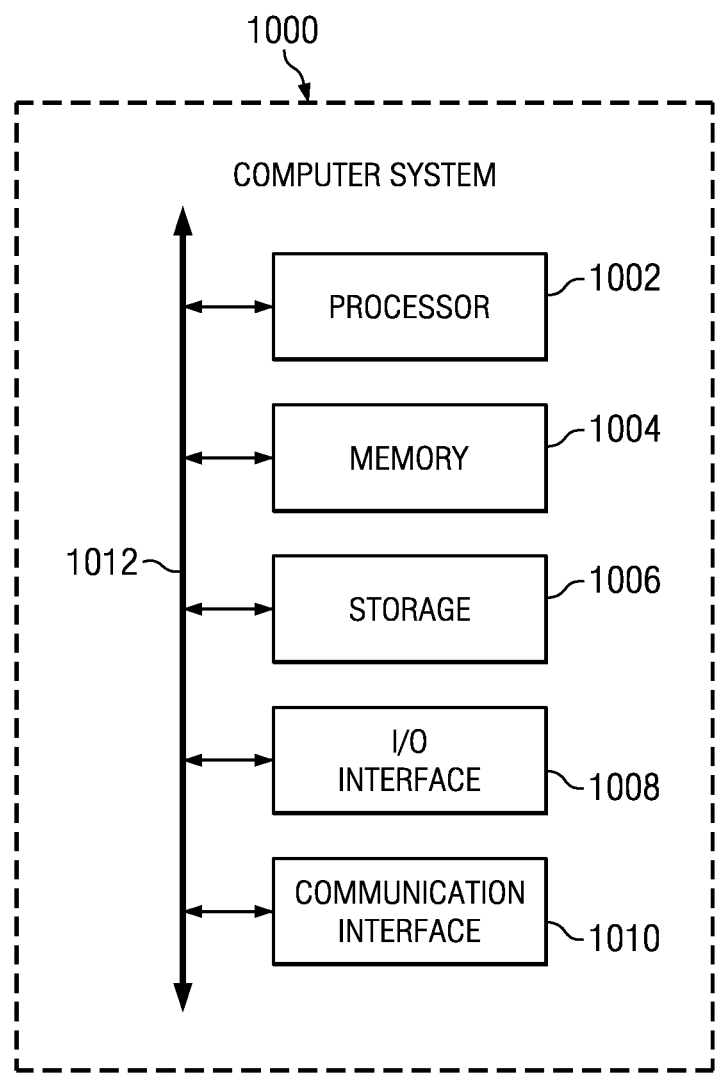
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple datacenters; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include an HDD, a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 105 U.S.C. §101. Herein, reference to a computer-readable storage medium excludes transitory forms of signal transmission (such as a propagating electrical or electromagnetic signal per se) to the extent that they are not eligible for patent protection under 105 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 1002 (such as, for example, one or more internal registers or caches), one or more portions of memory 1004, one or more portions of storage 1006, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), XML, or other suitable markup language.

Figure 11:
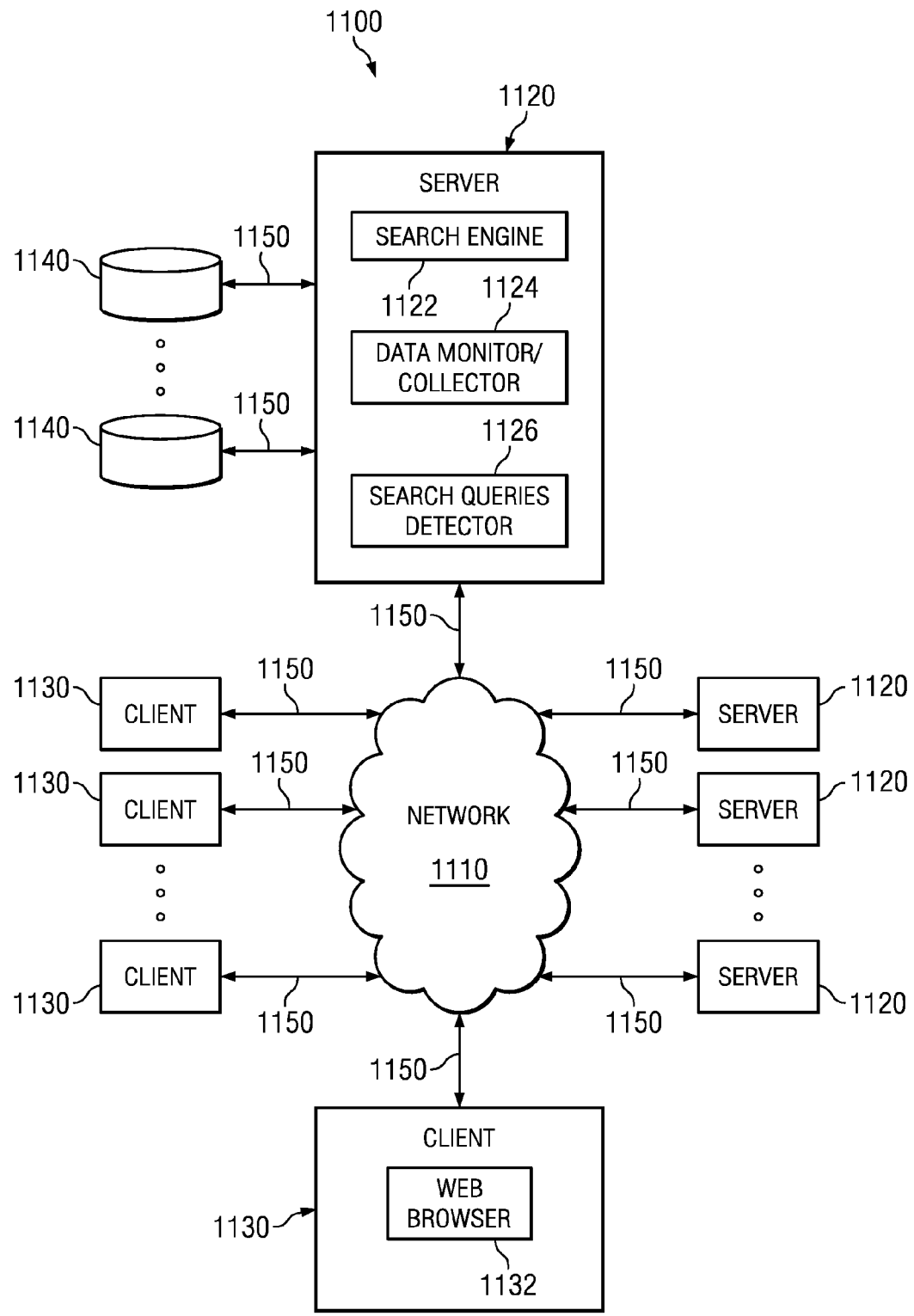
FIG. 11 illustrates an example computer system.

FIG. 11 illustrates an example network environment 1100. This disclosure contemplates any suitable network environment 1100. As an example and not by way of limitation, although this disclosure describes and illustrates a network environment 1100 that implements a client-server model, this disclosure contemplates one or more portions of a network environment 1100 being peer-to-peer, where appropriate. Particular embodiments may operate in whole or in part in one or more network environments 1100. In particular embodiments, one or more elements of network environment 1100 provide functionality described or illustrated herein. Particular embodiments include one or more portions of network environment 1100. Network environment 1100 includes a network 1110 coupling one or more servers 1120 and one or more clients 1130 to each other. This disclosure contemplates any suitable network 1110. As an example and not by way of limitation, one or more portions of network 1110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1110 may include one or more networks 1110.

Links 1150 couple servers 1120 and clients 1130 to network 1110 or to each other. This disclosure contemplates any suitable links 1150. As an example and not by way of limitation, one or more links 1150 each include one or more wireline (such as, for example, DSL or DOCSIS), wireless (such as, for example, Wi-Fi or Worldwide Interoperability for Microwave Access (WiMAX)) or optical (such as, for example, SONET or SDH) links 1150. In particular embodiments, one or more links 1150 each includes an intranet, an extranet, a VPN, a LAN, a WLAN, a WAN, a MAN, a communications network, a satellite network, a portion of the Internet, or another link 1150 or a combination of two or more such links 1150. Links 1150 need not necessarily be the same throughout network environment 1100. One or more first links 1150 may differ in one or more respects from one or more second links 1150.

This disclosure contemplates any suitable servers 1120. As an example and not by way of limitation, one or more servers 1120 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 1120 includes hardware, software, or both for providing the functionality of server 1120. As an example and not by way of limitation, a server 1120 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 1130, the web server may communicate one or more such files to client 1130. As another example, a server 1120 that operates as a mail server may be capable of providing e-mail services to one or more clients 1130. As another example, a server 1120 that operates as a database server may be capable of providing an interface for interacting with one or more data stores (such as, for example, data stores 11110 described below). Where appropriate, a server 1120 may include one or more servers 1120; be unitary or distributed; span multiple locations; span multiple machines; span multiple datacenters; or reside in a cloud, which may include one or more cloud components in one or more networks.

In particular embodiments, one or more links 1150 may couple a server 1120 to one or more data stores 1140. A data store 1140 may store any suitable information, and the contents of a data store 1140 may be organized in any suitable manner. As an example and not by way or limitation, the contents of a data store 1140 may be stored as a dimensional, flat, hierarchical, network, object-oriented, relational, XML, or other suitable database or a combination or two or more of these. A data store 1140 (or a server 1120 coupled to it) may include a database-management system or other hardware or software for managing the contents of data store 1140. The database-management system may perform read and write operations, delete or erase data, perform data deduplication, query or search the contents of data store 1140, or provide other access to data store 1140.

In particular embodiments, one or more servers 1120 may each include one or more search engines 1122. A search engine 1122 may include hardware, software, or both for providing the functionality of search engine 1122. As an example and not by way of limitation, a search engine 1122 may implement one or more search algorithms to identify network resources in response to search queries received at search engine 1122, one or more ranking algorithms to rank identified network resources, or one or more summarization algorithms to summarize identified network resources. In particular embodiments, a ranking algorithm implemented by a search engine 1122 may use a machine-learned ranking formula, which the ranking algorithm may obtain automatically from a set of training data constructed from pairs of search queries and selected Uniform Resource Locators (URLs), where appropriate.

In particular embodiments, one or more servers 1120 may each include one or more data monitors/collectors 1124. A data monitor/collection 1124 may include hardware, software, or both for providing the functionality of data collector/collector 1124. As an example and not by way of limitation, a data monitor/collector 1124 at a server 1120 may monitor and collect network-traffic data at server 1120 and store the network-traffic data in one or more data stores 1140. In particular embodiments, server 1120 or another device may extract pairs of search queries and selected URLs from the network-traffic data, where appropriate.

This disclosure contemplates any suitable clients 1130. A client 1130 may enable a user at client 1130 to access or otherwise communicate with network 1110, servers 1120, or other clients 1130. As an example and not by way of limitation, a client 1130 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 1130 may be an electronic device including hardware, software, or both for providing the functionality of client 1130. As an example and not by way of limitation, a client 1130 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 1130 may include one or more clients 1130; be unitary or distributed; span multiple locations; span multiple machines; span multiple datacenters; or reside in a cloud, which may include one or more cloud components in one or more networks.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computer systems:
    receiving health sensor data, meteorological sensor data, and energy-management sensor data from a plurality of sensors associated with a plurality of persons;
    for each of the sensors, identifying the person associated with the sensor;
    determining whether the sensor data are valid based on ownership information contained within the received sensor data;
    removing the sensor data determined to be not valid; and
    for the sensor data that are valid:
        for each person, aggregating the health sensor data from sensors associated with the person, and aggregating the energy-management sensor data from sensors associated with the person;
        aggregating the meteorological sensor data from the sensors associated with the plurality of persons;
        routing the aggregated health sensor data for each person to a health monitoring sensor-application-service provider associated with the respective person;
        routing the aggregated energy-management sensor data for each person to an energy-management monitoring sensor-application-service provider associated with the respective person; and
        routing the aggregated meteorological data for the plurality of persons to a meteorological monitoring sensor-application-service provider.

2. The method of claim 1, wherein the sensor data are further associated with a plurality of properties.

3. The method of claim 1, wherein the sensor data are further associated with a plurality of sensor communities.

4. The method of claim 1, wherein one or more primary software processes associated with the person perform the validation, aggregation, and routing.

5. The method of claim 4, wherein one or more secondary software processes are also associated with the person, the secondary software processes providing one or more sensor-brokering services, property-coordination services, community-coordination services, personal-portal services, accounting services, entity-management services, entity-modeling services, or policing services.

6. The method of claim 5, wherein one or more third-party software processes utilizing a service framework and application programming interface (API) extend the primary and secondary software processes.

7. The method of claim 6, wherein the primary, secondary, and third-party processes are independent threads of control.

8. The method of claim 7, wherein the primary, secondary, and third-party processes are distributed across a plurality of networked computing platforms in a unified computing system (UCS) environment.

9. The method of claim 1, wherein adapting the sensor data for communication to the sensor application provider comprises adapting the sensor data from a first data format supported by the community based sensor coordination entity to a second data format supported by the application provider.

10. The method of claim 1, wherein one or more of the sensors are mobile sources.

11. The method of claim 10, wherein one or more of the mobile sources are smartphones associated with persons.

12. The method of claim 10, wherein some of the sensor data from the mobile sources are received over Short Message Service (SMS).

13. The method of claim 10, wherein the sensor data from the mobile sources comprise mobile-source preamble information, the mobile-source preamble information comprising:
    caller identification (ID) information identifying the mobile source or the person;
    sensor type information identifying a sensor type of each sensor that generated a portion of the sensor data; and
    sensor ID information identifying each sensor that generated a portion of the sensor data.

14. The method of claim 1, wherein one or more of the sensors are fixed sources.

15. One or more computer-readable non-transitory storage media embodying logic operable when executed to:
    receive health sensor data, meteorological sensor data, and energy-management sensor data from a plurality of sensors associated with a plurality of persons;
    for each of the sensors, identify the person associated with the sensor;
    determine whether the sensor data are valid based on ownership information contained within the received sensor data;
    remove the sensor data determined to be not valid; and
    for the sensor data that are valid:
        for each person, aggregate the health sensor data from sensors associated with the person, and aggregate the energy-management sensor data from sensors associated with the person;

aggregate the meteorological sensor data from the sensors associated with the plurality of persons;
route the aggregated health sensor data for each person to a health monitoring sensor-application-service provider associated with the respective person;
route the aggregated energy-management sensor data for each person to an energy-management monitoring sensor-application-service provider associated with the respective person; and
route the aggregated meteorological data for the plurality of persons to a meteorological monitoring sensor-application-service provider.

16. The media of claim 15, wherein the sensor data are further associated with a plurality of properties.

17. The media of claim 15, wherein the sensor data are further associated with a plurality of sensor communities.

18. The media of claim 15, wherein one or more primary software processes associated with the person perform the validation, aggregation, and routing.

19. The media of claim 18, wherein one or more secondary software processes are also associated with the person, the secondary software processes providing one or more sensor-brokering services, property-coordination services, community-coordination services, personal-portal services, accounting services, entity-management services, entity-modeling services, or policing services.

20. The media of claim 19, wherein one or more third-party software processes utilizing a service framework and application programming interface (API) extend the primary and secondary software processes.

21. The media of claim 20, wherein the primary, secondary, and third-party processes are independent threads of control.

22. The media of claim 21, wherein the primary, secondary, and third-party processes are distributed across a plurality of networked computing platforms in a unified computing system (UCS) environment.

23. The media of claim 15, wherein adapting the sensor data for communication to the sensor application provider comprises adapting the sensor data from a first data format supported by the community based sensor coordination entity to a second data format supported by the application provider.

24. The media of claim 15, wherein one or more of the sensors are mobile sources.

25. The media of claim 24, wherein one or more of the mobile sources are smartphones associated with persons.

26. The media of claim 24, wherein some of the sensor data from the mobile sources are received over Short Message Service (SMS).

27. The media of claim 24, wherein the sensor data from the mobile sources comprise mobile-source preamble information, the mobile-source preamble information comprising:
caller identification (ID) information identifying the mobile source or the person;
sensor type information identifying a sensor type of each sensor that generated a portion of the sensor data; and
sensor ID information identifying each sensor that generated a portion of the sensor data.

28. The media of claim 15, wherein one or more of the sensors are fixed sources.

29. An apparatus comprising:
one or more communication interfaces;
one or more memory devices containing one or more instructions for execution by one or more processing devices; and
the processing devices, operable when executing the instructions to:
receive health sensor data, meteorological sensor data, and energy-management sensor data from a plurality of sensors associated with a plurality of persons;
for each of the sensors, identify the person associated with the sensor;
determine whether the sensor data are valid based on ownership information contained within the received sensor data;
remove the sensor data determined to be not valid; and
for the sensor data that are valid:
for each person, aggregate the health sensor data from sensors associated with the person, and aggregate the energy-management sensor data from sensors associated with the person;
aggregate the meteorological sensor data from the sensors associated with the plurality of persons;
route the aggregated health sensor data for each person to a health monitoring sensor-application-service provider associated with the respective person;
route the aggregated energy-management sensor data for each person to an energy-management monitoring sensor-application-service provider associated with the respective person; and
route the aggregated meteorological data for the plurality of persons to a meteorological monitoring sensor-application-service provider.

30. The apparatus of claim 29, wherein the sensor data are further associated with a plurality of properties.

31. The apparatus of claim 29, wherein the sensor data are further associated with a plurality of sensor communities.

32. The apparatus of claim 29, wherein one or more primary software processes associated with the person perform the validation, aggregation, and routing.

33. The apparatus of claim 32, wherein one or more secondary software processes are also associated with the person, the secondary software processes providing one or more sensor-brokering services, property-coordination services, community-coordination services, personal-portal services, accounting services, entity-management services, entity-modeling services, or policing services.

34. The apparatus of claim 33, wherein one or more third-party software processes utilizing a service framework and application programming interface (API) extend the primary and secondary software processes.

35. The apparatus of claim 34, wherein the primary, secondary, and third-party processes are independent threads of control.

36. The apparatus of claim 35, wherein the primary, secondary, and third-party processes are distributed across a plurality of networked computing platforms in a unified computing system (UCS) environment.

37. The apparatus of claim 29, wherein adapting the sensor data for communication to the sensor application provider comprises adapting the sensor data from a first data format supported by the community based sensor coordination entity to a second data format supported by the application provider.

38. The apparatus of claim 29, wherein one or more of the sensors are mobile sources.

39. The apparatus of claim 38, wherein one or more of the mobile sources are smartphones associated with persons.

40. The apparatus of claim 38, wherein some of the sensor data from the mobile sources are received over Short Message Service (SMS).

41. The apparatus of claim 38, wherein the sensor data from the mobile sources comprise mobile-source preamble information, the mobile-source preamble information comprising:

caller identification (ID) information identifying the mobile source or the person;

sensor type information identifying a sensor type of each sensor that generated a portion of the sensor data; and sensor ID information identifying each sensor that generated a portion of the sensor data.

42. The apparatus of claim 29, wherein one or more of the sensors are fixed sources.

* * * * *